US012609761B2

(12) United States Patent

Edge

(10) Patent No.: US 12,609,761 B2

(45) Date of Patent: *Apr. 21, 2026

(54) SYSTEMS AND METHODS FOR SUPPORT OF A 5G SATELLITE RADIO ACCESS TECHNOLOGY

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/358,751

(22) Filed: Jul. 25, 2023

(65) Prior Publication Data

US 2023/0370157 A1     Nov. 16, 2023

Related U.S. Application Data

(63) Continuation of application No. 17/090,718, filed on Nov. 5, 2020, now Pat. No. 11,811,488.

(Continued)

(51) Int. Cl.
*H04B 7/185*          (2006.01)
*H04W 4/029*          (2018.01)
(Continued)

(52) U.S. Cl.
CPC ........ *H04B 7/18513* (2013.01); *H04W 4/029* (2018.02); *H04W 4/90* (2018.02); *H04W 60/00* (2013.01)

(58) Field of Classification Search
CPC ....... H04W 4/029; H04W 4/90; H04W 36/30; H04W 60/00; H04W 36/00; H04W 48/10;
(Continued)

(56) References Cited

U.S. PATENT DOCUMENTS

| | | | |
|---|---|---|---|
| 10,985,835 | B2 | 4/2021 | Zheng et al. |
| 11,284,310 | B2 | 3/2022 | Shan |

(Continued)

FOREIGN PATENT DOCUMENTS

| | | |
|---|---|---|
| CA | 2813271 A1 | 5/2012 |
| CN | 1377465 A | 10/2002 |

(Continued)

OTHER PUBLICATIONS

"3rd Generation Partnership Project; Technical Specification Group Radio Access Network; Solutions for NR to Support Non-Terrestrial Networks (NTN) (Release 16)", 3GPP Standard; Technical Report; 3GPP TR 38.821, 3rd Generation Partnership Project, Mobile Competence Centre ; 650, Route Des Lucioles; F-06921 Sophia-Antipolis Cedex; France, No. V0.4.0, Apr. 11, 2019, pp. 1-46, XP051723405, Paragraph [04.2], Paragraph [08.1], Paragraph [08.3].

(Continued)

*Primary Examiner* — Marcos L Torres
(74) *Attorney, Agent, or Firm* — Weaver Austin Villenueve & Sampson LLP

(57)          ABSTRACT

Access, mobility management and regulatory services are supported for satellite access to a Fifth Generation (5G) core network. A coverage area, e.g., country, region, multiple countries, and international areas, are divided into fixed virtual cells having well defined geographic boundaries and fixed tracking areas. Information for the virtual cells and/or tracking areas and associated with one or more public land mobile networks (PLMNs) may be provided to a user equipment (UE). The UE may obtain its position, e.g., using a satellite positioning system, and determine the serving virtual cell or tracking area in which it is located. The UE may perform registration with a serving core network in a serving PLMN associated with the serving virtual cell or (Continued)

tracking area. Regulatory services, such as emergency (EM) calls, lawful interception (LI), wireless emergency alerts (WEA) may be provided based on the serving virtual cell or tracking area.

30 Claims, 11 Drawing Sheets

Related U.S. Application Data

(60) Provisional application No. 62/932,486, filed on Nov. 7, 2019.

(51) Int. Cl.
*H04W 4/90* (2018.01)
*H04W 60/00* (2009.01)

(58) Field of Classification Search
CPC .. H04W 48/18; H04W 84/06; H04B 7/18513; H04B 7/18545
See application file for complete search history.

(56) References Cited

U.S. PATENT DOCUMENTS

| | | | |
|---|---|---|---|
| 11,296,782 B2 | 4/2022 | Edge | |
| 11,297,519 B2 | 4/2022 | Kubota et al. | |
| 11,303,352 B2 | 4/2022 | Ravishankar et al. | |
| 11,303,353 B2 | 4/2022 | Edge | |
| 11,683,088 B2 | 6/2023 | Edge | |
| 11,696,106 B2 | 7/2023 | Edge | |
| 2008/0102896 A1 | 5/2008 | Wang et al. | |
| 2009/0016274 A1 | 1/2009 | Nylander et al. | |
| 2012/0002646 A1 | 1/2012 | Zabawskyj et al. | |
| 2015/0341846 A1 | 11/2015 | Shi et al. | |
| 2016/0128020 A1 | 5/2016 | Agarwal et al. | |
| 2017/0353827 A1* | 12/2017 | D'Alberto | G06Q 30/0267 |
| 2018/0241464 A1* | 8/2018 | Michaels | H04B 7/18539 |
| 2018/0376443 A1 | 12/2018 | Maksimov et al. | |
| 2018/0376452 A1 | 12/2018 | Wei et al. | |
| 2019/0090289 A1 | 3/2019 | Huang-Fu et al. | |
| 2019/0182897 A1 | 6/2019 | Jain et al. | |
| 2019/0207676 A1 | 7/2019 | Noerpel et al. | |
| 2019/0246260 A1 | 8/2019 | Edge et al. | |
| 2019/0335517 A1 | 10/2019 | Reial et al. | |
| 2020/0077358 A1* | 3/2020 | Kovacs | H04B 7/18526 |
| 2020/0236731 A1 | 7/2020 | Jung et al. | |
| 2021/0068065 A1 | 3/2021 | Wigard et al. | |
| 2021/0092640 A1 | 3/2021 | Ravishankar et al. | |
| 2021/0105693 A1* | 4/2021 | Tripathi | H04W 84/06 |
| 2021/0136666 A1 | 5/2021 | Srivastava et al. | |
| 2021/0143897 A1 | 5/2021 | Edge | |
| 2021/0144670 A1 | 5/2021 | Shrestha | |
| 2021/0211191 A1 | 7/2021 | Zheng et al. | |
| 2021/0212014 A1 | 7/2021 | Gao et al. | |
| 2021/0218467 A1 | 7/2021 | Jin et al. | |
| 2021/0242933 A1 | 8/2021 | Edge | |
| 2021/0250781 A1 | 8/2021 | Dang et al. | |
| 2021/0289339 A1 | 9/2021 | Yu et al. | |
| 2021/0314060 A1 | 10/2021 | Shi et al. | |
| 2021/0385675 A1 | 12/2021 | Määttänen et al. | |
| 2021/0399797 A1 | 12/2021 | Khan et al. | |
| 2022/0007267 A1 | 1/2022 | Maattanen et al. | |
| 2022/0007328 A1 | 1/2022 | Sun | |
| 2022/0022155 A1 | 1/2022 | Wang et al. | |
| 2022/0078746 A1 | 3/2022 | Lee et al. | |
| 2022/0086671 A1 | 3/2022 | Hong | |
| 2022/0086713 A1 | 3/2022 | Maattanen et al. | |
| 2022/0095260 A1 | 3/2022 | Shan | |
| 2022/0132453 A1 | 4/2022 | Wei et al. | |
| 2022/0217561 A1 | 7/2022 | Geng et al. | |
| 2022/0225208 A1 | 7/2022 | Wang et al. | |

FOREIGN PATENT DOCUMENTS

| | | | |
|---|---|---|---|
| CN | 103222228 A | 7/2013 | |
| CN | 103987058 A | 8/2014 | |
| CN | 104904260 A | 9/2015 | |
| CN | 105432130 A | 3/2016 | |
| CN | 106031211 A | 10/2016 | |
| CN | 106569229 A | 4/2017 | |
| CN | 107404715 A | 11/2017 | |
| CN | 108307681 A | 7/2018 | |
| EP | 2014111 A2 | 1/2009 | |
| EP | 1987691 B1 | 7/2009 | |
| EP | 2603998 A2 | 6/2013 | |
| EP | 2966903 A1 | 1/2016 | |
| WO | WO 0021216 A2 | 4/2000 | |
| WO | 0180578 A1 | 10/2001 | |
| WO | WO 2008054668 A2 | 5/2008 | |
| WO | WO 2012171128 A1 | 12/2012 | |
| WO | 2016101563 A1 | 6/2016 | |
| WO | 2018009362 A2 | 1/2018 | |
| WO | WO 2019080056 A1 | 5/2019 | |
| WO | 2021066487 A1 | 4/2021 | |

OTHER PUBLICATIONS

Huawei: "Support of Location Reporting Function in NG-RAN", 3GPP Draft, 3GPP TSG-RAN3 Meeting #99bis, R3-182029, 3rd Generation Partnership Project (3GPP), Mobile Competence Centre, 650, Route Des Lucioles, F-06921 Sophia-Antipolis Cedex, France, vol. RAN WG3. No. Sanya, China, Apr. 16, 2018-Apr. 20, 2018, Apr. 15, 2018 (Apr. 15, 2018), XP051430187, 4 Pages, Proposal 4.

Hughes: "NR-NTN: Paging in NGSO Satellite Systems", 3GPP TSG RAN WG3 Meeting #101, 3GPP Draft, R3-184403, 3rd Generation Partnership Project (3GPP), Mobile Competence Centre, 650, Route Des Lucioles, F-06921 Sophia-Antipolis Cedex, France, vol. RAN WG3, No. Gothernburg, Sweden; Aug. 20, 2018-Aug. 24, 2018, Aug. 10, 2018 (Aug. 10, 2018), 5 Pages, XP051527768, Chapters 2, 3, p. 3, line 25 line 35, the whole document.

International Preliminary Report on Patentability—PCT/US2020/059423, The International Bureau of WIPO—Geneva, Switzerland, May, 19, 2022.

International Preliminary Report on Patentability—PCT/US2020/059545, The International Bureau of WIPO—Geneva, Switzerland, May 19, 2022.

International Preliminary Report on Patentability—PCT/US2020/059549, The International Bureau of WIPO—Geneva, Switzerland, May 19, 2022.

International Search Report and Written Opinion PCT/US2020/059423—ISA/EPO—Feb. 26, 2021.

International Search Report and Written Opinion PCT/US2020/059545—ISA/EPO—Feb. 25, 2021.

International Search Report and Written Opinion PCT/US2020/059549—ISA/EPO—Mar. 2, 2021.

International Search Report and Written Opinion PCT/US2020/059556—ISA/EPO—Mar. 9, 2021.

International Search Report and Written Opinion PCT/US2020/059557—ISA/EPO—Mar. 2, 2021.

International Search Report and Written Opinion PCT/US2020/059558—ISA/EPO—Feb. 26, 2021.

LG Electronics Inc: "Considerations on Fixed on Earth Tracking Area Management in NTN", 3GPP TSG-RAN WG2 Meeting #105, 3GPP Draft; R2-1905122 Considerations on Fixed on Earth Tracking Area Management in NTN, 3rd Generation Partnership Project (3GPP), Mobile Competence Centre; 650, Route Des Lucioles; F-06921 Sophia-, vol. RAN WG2, No. Xi'an, China; Apr. 8, 2019-Apr. 12, 2019 Apr. 6, 2019 (Apr. 6, 2019), 3 Pages, XP051702398, The Whole Document.

LG Electronics Inc: "Report on Email Discussion [107#64] [NTN] Cell Selection & Reselection", 3GPP TSG-RAN WG2Meeting #107bis, 3GPP Draft; R2-1914070, Report of Email Discussion [107#64][NTN] Cell & Reselection, 3rd Generation Partnership

(56) References Cited

OTHER PUBLICATIONS

Project, Mobile Competence Centre; 650, Route Des Lucioles, F-06921 Soph, vol. RAN WG2, No. Chongqing, China; Oct. 14, 2019-Oct. 18, 2019, Oct. 18, 2019, 22 Pages, XP051797900, Zte Contribution, "Approach 2"; p. 17, p. 4-p. 14.

Lin X., et al., "5G New Radio Evolution Meets Satellite Communications: Opportunities, Challenges, and Solutions", arxiv.org, Cornell University Library, 201 Olin Library Cornell University Ithaca, NY14853, Mar. 27, 2019 (Mar. 27, 2019), XP081158513, pp. 1-8, Sections V-B and VI.

Nokia., et al., "Analysis on Tracking Area Design," 3GPP Draft, 3GPP TSG-WG3 Meeting #104, R3-193191_WAS_R3-192802 TA REVTHALES2, 3rd Generation Partnership Project (3GPP), Mobile Competence Centre, 650, Route Des Lucioles, F- 06921, Sophia-Antipolis Cedex, France, vol. RAN WG3, No. Reno, NV, USA; May 13, 2019-May 17, 2019, May 21, 2019 (May 21, 2019), XP051740754, 5 pages, the whole document, p. 3, paragraph 2.2.

Nomor Research GMBH., et al., "Multiple PLMN Identities in NTN", 3GPP Draft, 3GPP TSG-RAN WG2 Meeting #107-Bis, R2-1912696 Multiple_PLMN_NTN 3rd Generation Partnership Project (3GPP), Mobile Competence Centre, 650, Route Des Lucioles, F-06921, Sophia-Antipolis Cedex, France, vol. RAN WG2, No. Chongqing, China; Oct. 14, 2019-Oct. 18, 2019, Oct. 2, 2019 (Oct. 2, 2019), XP051803661, 6 pages, the whole document.

Nomor Research GMBH., et al., "UE Positioning Information for NTN Mobility", 3GPP Draft, 3GPP TSG RAN WG2 Meeting #105bis, R2-1904407_NTN_MobilityEnhancements, 3rd Generation Partnership Project (3GPP), Mobile Competence Centre, 650, Route Des Lucioles, F-06921 Sophia-Antipolis Cedex, France, vol. RAN WG2, No. Xi'an, China, Apr. 8, 2019-Apr. 12, 2019, Apr. 6, 2019 (Apr. 6, 2019), XP051701709, 4 Pages, the Whole Document.

Qualcomm Incorporated: "Virtual Cell Solution for Mobility and Regulatory Support for Satellite Access in 5G", SA WG2 Meeting #136, S2-1911058, 3rd Generation Partnership Project, Mobile Competence Centre, 650, Route Des Lucioles, F-06921, Sophia-Antipolis Cedex, France, vol. SA WG2, No. Reno, Nevada, USA, Nov. 18, 2019-Nov. 22, 2019, Nov. 8, 2019, 9 Pages, XP051821168.

Sakshi, P., et al., "A Survey on Energy Efficient Narrowband Internet of Things (NBIoT): Architecture, Application and Challenges", IEEE Access, vol. 7, 2018, (Current Version Feb. 14, 2019) pp. 16739-16776.

Thales., et al., "NR-NTN: TP for Chap 7.3 NR Modifications to Support NTN", 3GPP TSG RAN Meeting #80, RP-180658, La Jolla, USA, Jun. 11-Jun. 14, 2018, 37 Pages.

Thales: "NTN TR 38.821 Chap 8 Corrections", 3GPP TSG RAN WG3 Meeting #104, 3GPP Draft; R3-192760 NTN TR 38.821 Chap 8 Corrections V2, 3rd Generation Partnership Project (3GPP), Mobile Competence Centre; 650, Route Des Lucioles; F-06921 Sophia-Antipolis Cedex; France, vol. RAN WG3, No. Reno; May 13, 2019-May 17, 2019, May 3, 2019 (May 3, 2019), 26 Pages, XP051712953, paragraph [08.3].

Zte., et al., "Tracking Area Management and Paging Handling in NTN", 3GPP Draft, 3GPP TSG RAN WG3#103, R3-190139, Tracking Area Management and Paging Handling in NTN V5, 3rd Generation Partnership Project (3GPP), Mobile Competence Centre, 650, Route Des Lucioles, F-06921 Sophia-Antipolis Cedex, France, vol. RAN WG3, No. Athens, Greece, Feb. 25, 2019-Mar. 1, 2019, Feb. 16, 2019, 13 Pages, XP051604086, title, Chapters 1, 2, 8.3, para.2 and para.3.2, the whole document.

3GPP TR 23.737: "3rd Generation Partnership Project, Technical Specification Group Services and System Aspects, Study on Architecture Aspects for Using Satellite Access in 5G (Release 16)", 3GPP TR 23.737, V1.1.0, Oct. 2019, pp. 1-65.

Huawei: "Support of Location Reporting Function in NG-RAN", 3GPP TSG-RAN3 Meeting #99bis, R3-182029, Sanya, China, Apr. 16-20, 2018, Apr. 7, 2018, 4 Pages.

European Search Report—EP25203199—Search Authority—The Hague—Feb. 18, 2026.

LG Electronics Inc.: "Report on Email Discussion [107#64][NTN] Cell Selection & Reselection", 3GPP TSG-RAN WG2 Meeting#107 bis, R2-1914070, 3rd Generation Partnership Project, Mobile Competence Centre, 650, Route Des Lucioles, F-06921 Sophia-Antipolis Cedex, France, Vol. RAN WG1, No. Chongqing, China, Oct. 14, 2019-Oct. 18, 2019, Oct. 18, 2019, 21 Pages, XP051797900, ZTE Contribution, Approach 2; p. 17.

ZTE Corporation, et al., "TP on Tracking Area Management in NTN", 3GPP TSG-RAN WG2 Meeting#107bis, R2-1914199_TP On Tracking Area Management in NTN, 3rd Generation Partnership Project, Mobile Competence Centre, 650, Route Des Lucioles, F-06921 Sophia-Antipolis Cedex, France, Vol. RAN WG1, No. Chongqing, China, Oct. 14, 2019-Oct. 18, 2019, Oct. 18, 2019, 3 Pages, XP051797965, The Whole Document.

* cited by examiner

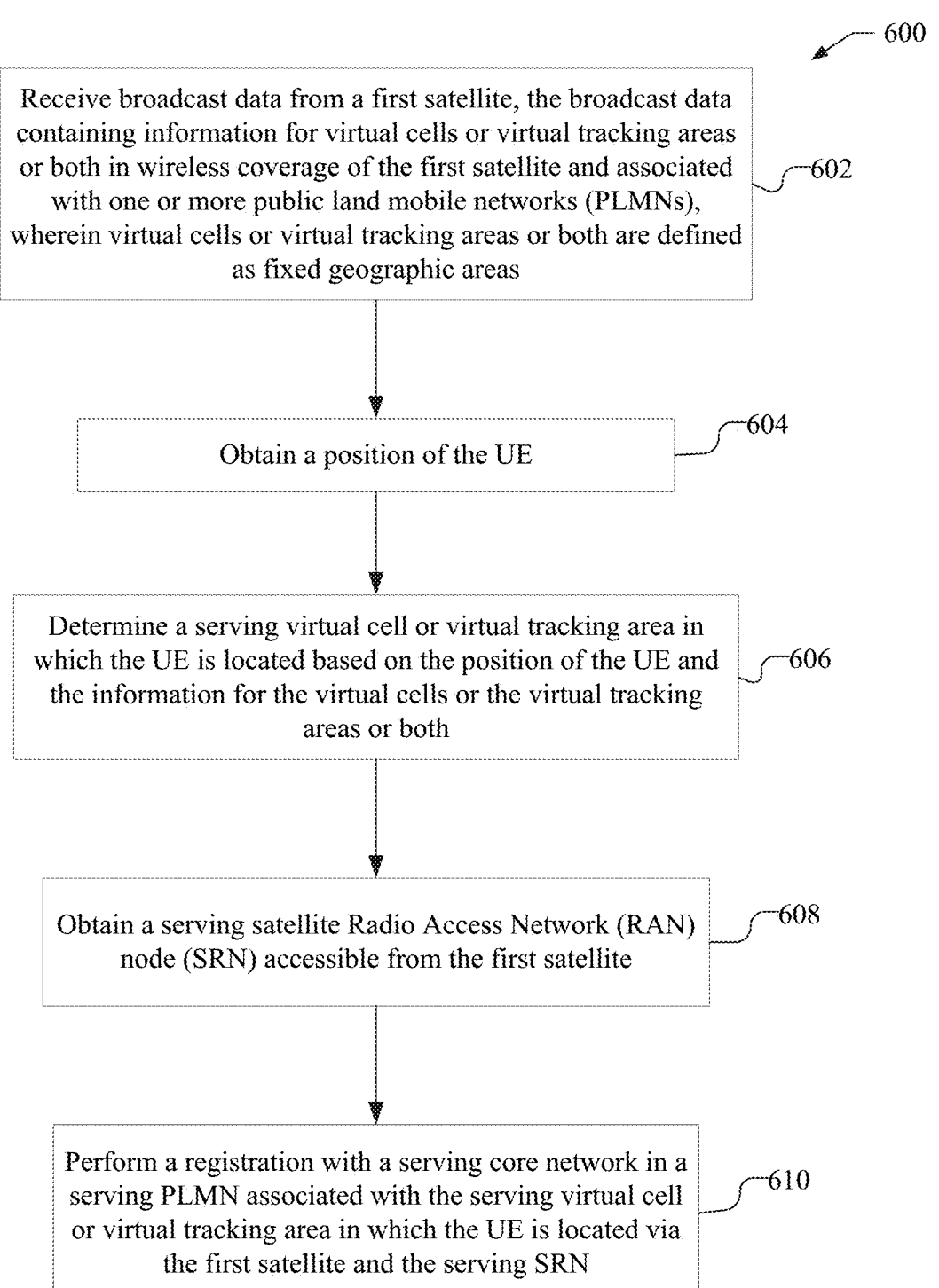

600

Receive broadcast data from a first satellite, the broadcast data containing information for virtual cells or virtual tracking areas or both in wireless coverage of the first satellite and associated with one or more public land mobile networks (PLMNs), wherein virtual cells or virtual tracking areas or both are defined as fixed geographic areas

602

Obtain a position of the UE

604

Determine a serving virtual cell or virtual tracking area in which the UE is located based on the position of the UE and the information for the virtual cells or the virtual tracking areas or both

606

Obtain a serving satellite Radio Access Network (RAN) node (SRN) accessible from the first satellite

608

Perform a registration with a serving core network in a serving PLMN associated with the serving virtual cell or virtual tracking area in which the UE is located via the first satellite and the serving SRN

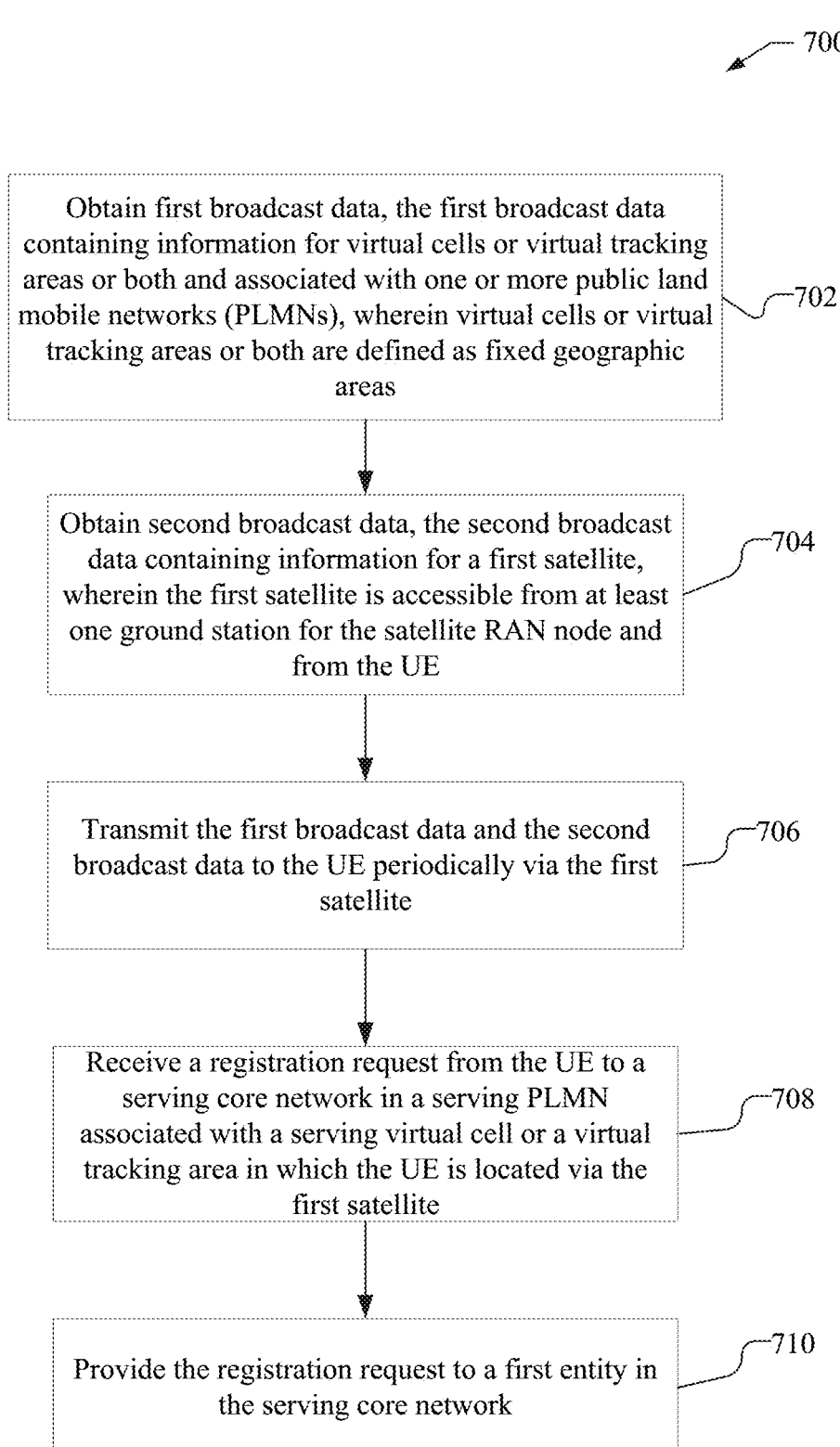

Obtain first broadcast data, the first broadcast data containing information for virtual cells or virtual tracking areas or both and associated with one or more public land mobile networks (PLMNs), wherein virtual cells or virtual tracking areas or both are defined as fixed geographic areas
702

Obtain second broadcast data, the second broadcast data containing information for a first satellite, wherein the first satellite is accessible from at least one ground station for the satellite RAN node and from the UE
704

Transmit the first broadcast data and the second broadcast data to the UE periodically via the first satellite
706

Receive a registration request from the UE to a serving core network in a serving PLMN associated with a serving virtual cell or a virtual tracking area in which the UE is located via the first satellite
708

Provide the registration request to a first entity in the serving core network
710

FIG. 7

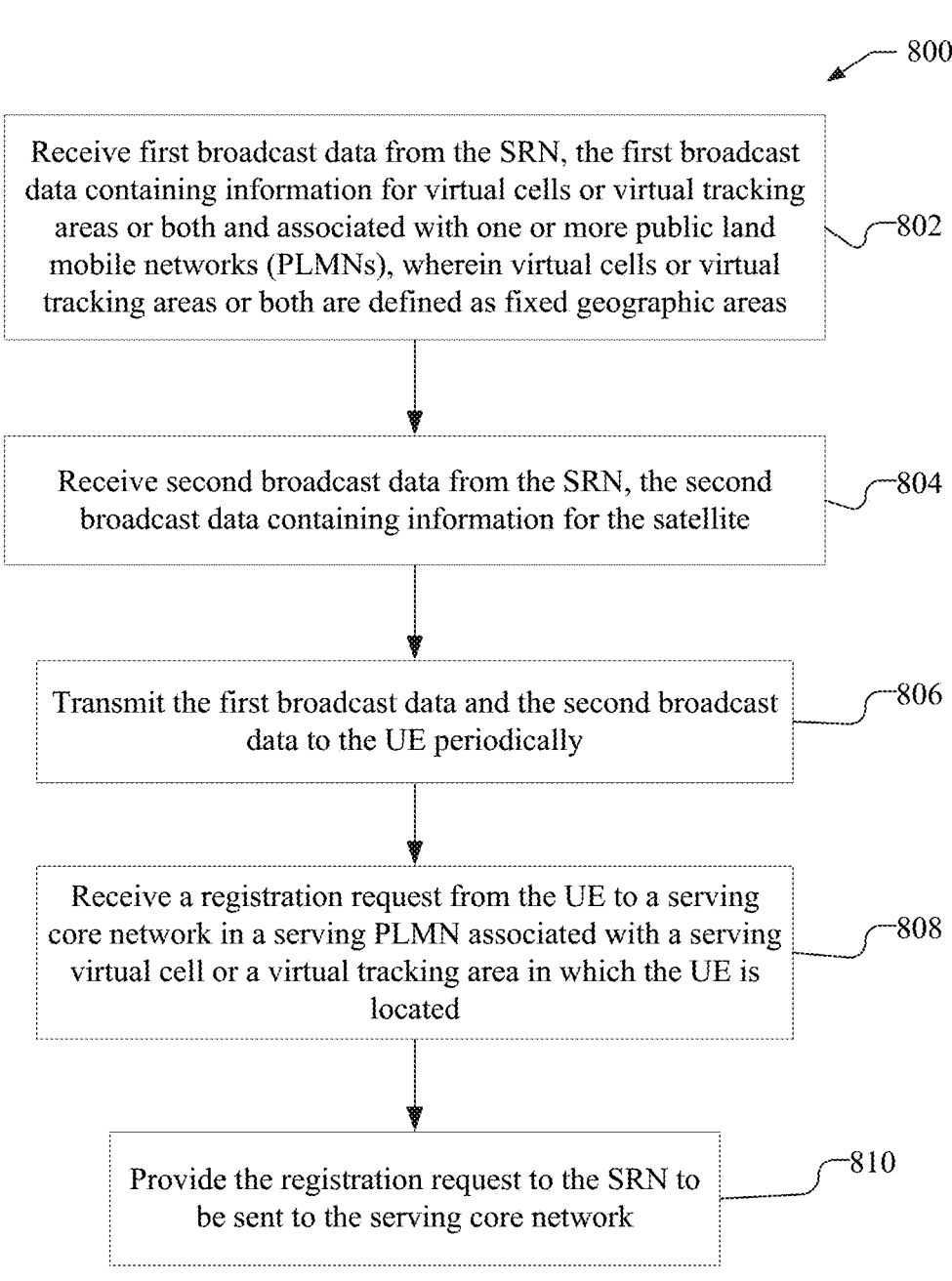

800

Receive first broadcast data from the SRN, the first broadcast data containing information for virtual cells or virtual tracking areas or both and associated with one or more public land mobile networks (PLMNs), wherein virtual cells or virtual tracking areas or both are defined as fixed geographic areas — 802

Receive second broadcast data from the SRN, the second broadcast data containing information for the satellite — 804

Transmit the first broadcast data and the second broadcast data to the UE periodically — 806

Receive a registration request from the UE to a serving core network in a serving PLMN associated with a serving virtual cell or a virtual tracking area in which the UE is located — 808

Provide the registration request to the SRN to be sent to the serving core network — 810

FIG. 8

SYSTEMS AND METHODS FOR SUPPORT OF A 5G SATELLITE RADIO ACCESS TECHNOLOGY

CLAIM OF PRIORITY UNDER 35 U.S.C. § 119

This application is a continuation of U.S. Non-Provisional Ser. No. 17/090,718, filed Nov. 5, 2020, and entitled "SYSTEMS AND METHODS FOR SUPPORT OF A 5G SATELLITE RADIO ACCESS TECHNOLOGY," which claims under 35 U.S.C. § 119 the benefit of and priority to U.S. Provisional Application No. 62/932,486, filed Nov. 7, 2019, and entitled "SYSTEMS AND METHODS FOR SUPPORT OF A 5G SATELLITE RADIO ACCESS TECHNOLOGY," which are assigned to the assignee hereof and are incorporated herein by reference in their entirety.

BACKGROUND

Field of the Disclosure

Various aspects described herein generally relate to wireless communication systems, and more particularly, to accessing a wireless network using communication satellites.

Description of Related Technology

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Work is ongoing to combine satellite-based communication systems with terrestrial wireless communications systems, such as 5G NR networks. In such a system, a UE would access a satellite (instead of a terrestrial base station), which would connect to a satellite earth station which in turn might connect to a base station which in turn would connect to a 5G Core Network (5GCN). A satellite-based communication system may include gateways and one or more satellites to relay communication signals between the gateways and one or more UEs. A gateway is an earth station having an antenna for transmitting signals to, and receiving signals from, communication satellites. A gateway provides communication links, using satellites, for connecting a UE to other user terminals or users of other communication systems, such as a public switched telephone network, the Internet and various public and/or private networks. A satellite is an orbiting receiver and repeater or regenerator used to relay information. The 5GCN could treat the satellite system as either another type of Radio Access Network (RAN) or another Radio Access Technology (RAT), distinct from, but also similar to, e.g., a 5G NR RAN (NG-RAN), 5G NR RAT or WLAN (WiFi) based RAN.

In a wireless communications system, such as a 5G NR network, that supports satellite access, it may be required that the communications system supports all regulatory requirements applicable to a terrestrial wireless communications system, such as supporting emergency (EM) calls, Lawful Interception (LI) and Wireless Emergency Alerting (WEA). Currently, however, there is no overall solution to meet such requirements.

SUMMARY

Access, mobility management and regulatory services are supported for satellite access to a Fifth Generation (5G) core network. A coverage area, e.g., country, region, multiple countries, and international areas, are divided into fixed virtual cells having well defined geographic boundaries and fixed tracking areas. Information for the virtual cells and/or tracking areas and associated with one or more public land mobile networks (PLMNs) may be provided to a user equipment (UE). The UE may obtain its position, e.g., using a satellite positioning system, and determine the serving virtual cell or tracking area in which it is located. The UE may perform registration with a serving core network in a serving PLMN associated with the serving virtual cell or tracking area. Regulatory services, such as emergency (EM) calls, lawful interception (LI), wireless emergency alerts (WEA) may be provided based on the serving virtual cell or tracking area.

In one implementation, a method for supporting satellite wireless access by a user equipment (UE) performed by the UE, includes receiving broadcast data from a first satellite, the broadcast data containing information for virtual cells or virtual tracking areas or both in wireless coverage of the first satellite and associated with one or more public land mobile networks (PLMNs), wherein the virtual cells or the virtual tracking areas or both are defined as fixed geographic areas; obtaining a position of the UE; determining a serving virtual cell or virtual tracking area in which the UE is located based on the position of the UE and the information for the virtual cells or the virtual tracking areas or both; obtaining a serving satellite Radio Access Network (RAN) node (SRN) accessible from the first satellite; and performing a registration with a serving core network in a serving PLMN associated with the serving virtual cell or virtual tracking area in which the UE is located via the first satellite and the serving SRN.

In one implementation, a user equipment (UE) configured to support satellite wireless access, includes a satellite transceiver configured to communicate with satellites; at least one memory; and at least one processor coupled to the satellite transceiver and the at least one memory, the at least one processor configured to: receive broadcast data from a first satellite, the broadcast data containing information for virtual cells or virtual tracking areas or both in wireless coverage of the first satellite and associated with one or more public land mobile networks (PLMNs), wherein the virtual cells or the virtual tracking areas or both are defined as fixed geographic areas; obtain a position of the UE; determine a serving virtual cell or virtual tracking area in which the UE is located based on the position of the UE and the information for the virtual cells or the virtual tracking areas or both; obtain a serving satellite Radio Access Network (RAN) node (SRN) accessible from the first satellite; and perform a registration with a serving core network in a serving PLMN associated with the serving virtual cell or virtual tracking area in which the UE is located via the first satellite and the serving SRN.

In one implementation, a user equipment (UE) configured to support satellite wireless access, includes means for receiving broadcast data from a first satellite, the broadcast data containing information for virtual cells or virtual tracking areas or both in wireless coverage of the first satellite and associated with one or more public land mobile networks (PLMNs), wherein the virtual cells or the virtual tracking areas or both are defined as fixed geographic areas; means for obtaining a position of the UE; means for determining a serving virtual cell or virtual tracking area in which the UE is located based on the position of the UE and the information for the virtual cells or the virtual tracking areas or both; means for obtaining a serving satellite Radio Access Network (RAN) node (SRN) accessible from the first satellite; and means for performing a registration with a serving core network in a serving PLMN associated with the serving virtual cell or virtual tracking area in which the UE is located via the first satellite and the serving SRN.

In one implementation, a non-transitory storage medium including program code stored thereon, the program code is operable to configure at least one processor in a user equipment (UE) to support satellite wireless access, includes program code to receive broadcast data from a first satellite, the broadcast data containing information for virtual cells or virtual tracking areas or both in wireless coverage of the first satellite and associated with one or more public land mobile networks (PLMNs), wherein the virtual cells or the virtual tracking areas or both are defined as fixed geographic areas; program code to obtain a position of the UE; program code to determine a serving virtual cell or virtual tracking area in which the UE is located based on the position of the UE and the information for the virtual cells or the virtual tracking areas or both; program code to obtain a serving satellite Radio Access Network (RAN) node (SRN) accessible from the first satellite; and program code to perform a registration with a serving core network in a serving PLMN associated with the serving virtual cell or virtual tracking area in which the UE is located via the first satellite and the serving SRN.

In one implementation, a method for supporting satellite wireless access by a user equipment (UE) performed by a satellite Radio Access Network (RAN) node, includes obtaining first broadcast data, the first broadcast data containing information for virtual cells or virtual tracking areas or both associated with one or more public land mobile networks (PLMNs), wherein the virtual cells or the virtual tracking areas or both are defined as fixed geographic areas; obtaining second broadcast data, the second broadcast data containing information for a first satellite, wherein the first satellite is accessible from at least one ground station for the satellite RAN node and from the UE; transmitting the first broadcast data and the second broadcast data to the UE periodically via the first satellite; receiving a registration request from the UE to a serving core network in a serving PLMN associated with a serving virtual cell or a virtual tracking area in which the UE is located via the first satellite; and providing the registration request to a first entity in the serving core network.

In one implementation, a satellite Radio Access Network (RAN) node configured to support satellite wireless access by a user equipment (UE), includes a satellite transceiver configured to communicate with satellites; an external interface to communicate with entities in a core network; at least one memory; and at least one processor coupled to the satellite transceiver, the external interface, and the at least one memory, the at least one processor configured to obtain first broadcast data, the first broadcast data containing information for virtual cells or virtual tracking areas or both associated with one or more public land mobile networks (PLMNs), wherein the virtual cells or the virtual tracking areas or both are defined as fixed geographic areas; obtain second broadcast data, the second broadcast data containing information for a first satellite, wherein the first satellite is accessible from at least one ground station for the satellite RAN node and from the UE; transmit the first broadcast data and the second broadcast data to the UE periodically via the first satellite; receive a registration request from the UE to a serving core network in a serving PLMN associated with a serving virtual cell or a virtual tracking area in which the UE is located via the first satellite; and provide the registration request to a first entity in the serving core network.

In one implementation, a satellite Radio Access Network (RAN) node configured to support satellite wireless access by a user equipment (UE), includes means for obtaining first broadcast data, the first broadcast data containing information for virtual cells or virtual tracking areas or both associated with one or more public land mobile networks (PLMNs), wherein the virtual cells or the virtual tracking areas or both are defined as fixed geographic areas; means for obtaining second broadcast data, the second broadcast data containing information for a first satellite, wherein the first satellite is accessible from at least one ground station for the satellite RAN node and from the UE; means for transmitting the first broadcast data and the second broadcast data to the UE periodically via the first satellite; means for receiving a registration request from the UE to a serving core network in a serving PLMN associated with a serving virtual cell or a virtual tracking area in which the UE is located via the first satellite; and means for providing the registration request to a first entity in the serving core network.

In one implementation, a non-transitory storage medium including program code stored thereon, the program code is operable to configure at least one processor in a satellite Radio Access Network (RAN) node to support satellite wireless access by a user equipment (UE), includes program code to obtain first broadcast data, the first broadcast data containing information for virtual cells or virtual tracking areas or both associated with one or more public land mobile networks (PLMNs), wherein the virtual cells or the virtual tracking areas or both are defined as fixed geographic areas; program code to obtain second broadcast data, the second broadcast data containing information for a first satellite, wherein the first satellite is accessible from at least one ground station for the satellite RAN node and from the UE; program code to transmit the first broadcast data and the second broadcast data to the UE periodically via the first satellite; program code to receive a registration request from the UE to a serving core network in a serving PLMN associated with a serving virtual cell or a virtual tracking area in which the UE is located via the first satellite; and program code to provide the registration request to a first entity in the serving core network.

In one implementation, a method for supporting satellite wireless access by a user equipment (UE) performed by a satellite that is in wireless communication with a satellite Radio Access Network (RAN) node (SRN), includes receiving first broadcast data from the SRN, the first broadcast data containing information for virtual cells or virtual tracking areas or both associated with one or more public land mobile networks (PLMNs), wherein the virtual cells or the virtual tracking areas or both are defined as fixed geographic areas;

receiving second broadcast data from the SRN, the second broadcast data containing information for the satellite; transmitting the first broadcast data and the second broadcast data to the UE periodically; receiving a registration request from the UE to a serving core network in a serving PLMN associated with a serving virtual cell or a virtual tracking area in which the UE is located; and providing the registration request to the SRN to be sent to the serving core network.

In one implementation, a satellite that is in wireless communication with a satellite Radio Access Network (RAN) node (SRN) and configured to support satellite wireless access by a user equipment (UE), includes a wireless transceiver configured to communicate with UEs and with satellite RAN nodes; at least one memory; and at least one processor coupled to the wireless transceiver and the at least one memory, the at least one processor configured to: receive first broadcast data from the SRN, the first broadcast data containing information for virtual cells or virtual tracking areas or both associated with one or more public land mobile networks (PLMNs), wherein the virtual cells or the virtual tracking areas or both are defined as fixed geographic areas; receive second broadcast data from the SRN, the second broadcast data containing information for the satellite; transmit the first broadcast data and the second broadcast data to the UE periodically; receive a registration request from the UE to a serving core network in a serving PLMN associated with a serving virtual cell or a virtual tracking area in which the UE is located; and provide the registration request to the SRN to be sent to the serving core network.

In one implementation, a satellite that is in wireless communication with a satellite Radio Access Network (RAN) node (SRN) and configured to support satellite wireless access by a user equipment (UE), includes means for receiving first broadcast data from the SRN, the first broadcast data containing information for virtual cells or virtual tracking areas or both associated with one or more public land mobile networks (PLMNs), wherein the virtual cells or the virtual tracking areas or both are defined as fixed geographic areas; means for receiving second broadcast data from the SRN, the second broadcast data containing information for the satellite; means for transmitting the first broadcast data and the second broadcast data to the UE periodically; means for receiving a registration request from the UE to a serving core network in a serving PLMN associated with a serving virtual cell or a virtual tracking area in which the UE is located; and means for providing the registration request to the SRN to be sent to the serving core network.

In one implementation, a non-transitory storage medium including program code stored thereon, the program code is operable to configure at least one processor in a satellite that is in wireless communication with a satellite Radio Access Network (RAN) node (SRN) to support satellite wireless access by a user equipment (UE), includes program code to receive first broadcast data from the SRN, the first broadcast data containing information for virtual cells or virtual tracking areas or both associated with one or more public land mobile networks (PLMNs), wherein the virtual cells or the virtual tracking areas or both are defined as fixed geographic areas; program code to receive second broadcast data from the SRN, the second broadcast data containing information for the satellite; program code to transmit the first broadcast data and the second broadcast data to the UE periodically; program code to receive a registration request from the UE to a serving core network in a serving PLMN associated with a serving virtual cell or a virtual tracking area in which the UE is located; and program code to provide the registration request to the SRN to be sent to the serving core network.

BRIEF DESCRIPTION OF THE DRAWINGS

FIG. 6 shows a flowchart of an example procedure for supporting satellite wireless access by a user equipment (UE) performed by the UE FIG. 7 shows a flowchart of an example procedure for supporting satellite wireless access by UE performed by a satellite Radio Access Network (RAN) node (SRN).

FIG. 8 shows a flowchart of an example procedure for supporting satellite wireless access by a UE performed by a satellite that is in wireless communication with an SRN.

Figure 1:
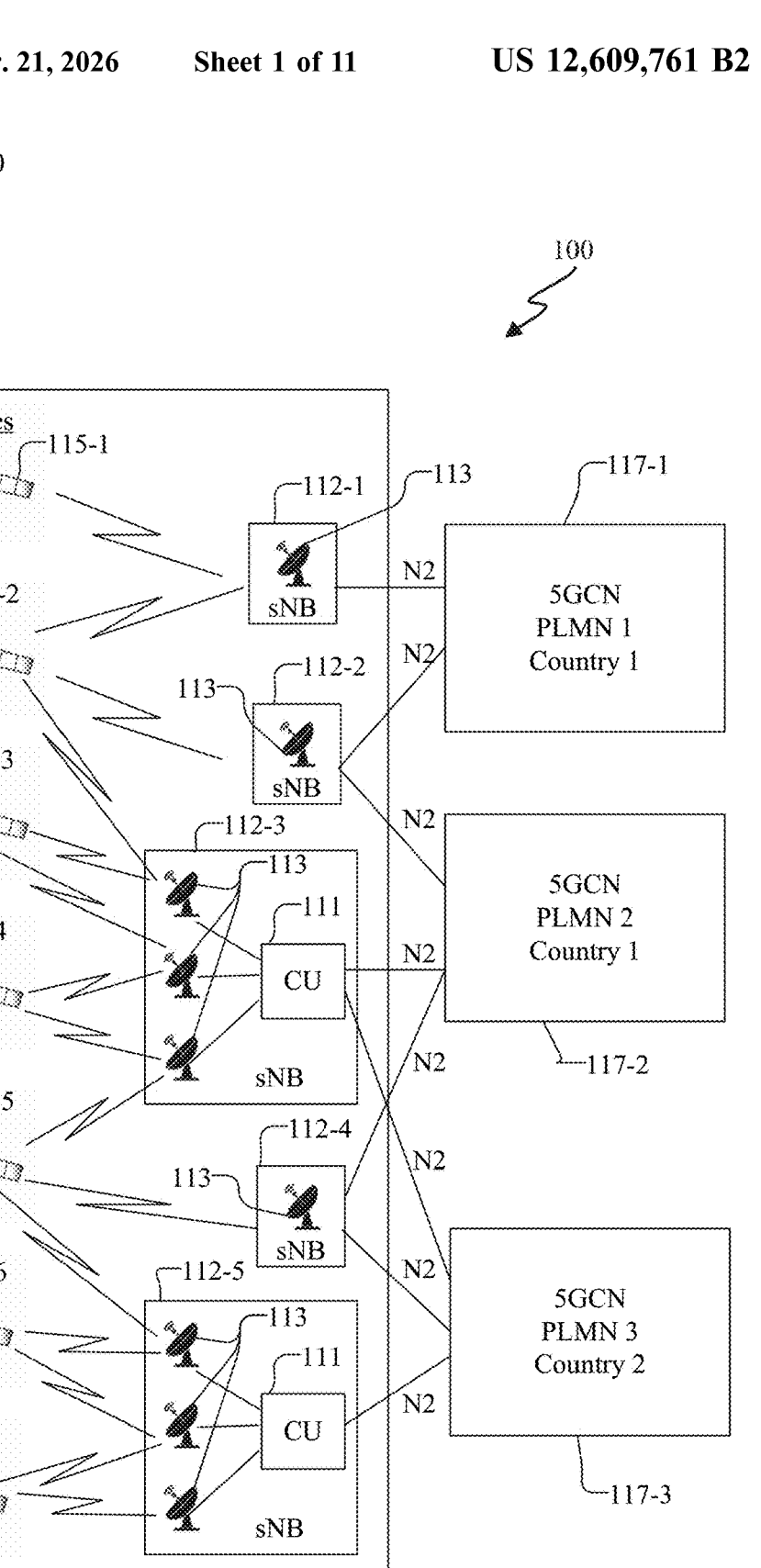
FIG. 1 shows a diagram of a communication system capable of supporting access, mobility management and regulatory services for satellite access in 5G NR.

Like reference symbols in the various drawings indicate like elements, in accordance with certain example implementations. In addition, multiple instances of an element may be indicated by following a first number for the element with a letter or a hyphen and a second number. For example, multiple instances of an element 115 may be indicated as 115-1, 115-2, 115-3 etc. When referring to such an element using only the first number, any instance of the element is to be understood (e.g. element 115 in the previous example would refer to elements 115-1, 115-2 and 115-3).

DETAILED DESCRIPTION

A common means to determine the location of a mobile device is to use a satellite position system (SPS), such as the well-known Global Positioning Satellite (GPS) system or Global Navigation Satellite System (GNSS), which employ a number of satellites that are in orbit around the Earth. Position measurements using SPS are based on measurements of propagation delay times of SPS signals broadcast from a number of orbiting satellites to an SPS receiver. Once the SPS receiver has measured the signal propagation delays for each satellite, the range to each satellite can be determined and precise navigation information including 3-dimensional position, velocity and time of day of the SPS receiver can then be determined using the measured ranges and the known locations of the satellites.

Satellites may also be used in communication systems, for example, using gateways and one or more satellites to relay communication signals between the gateways and one or more user terminals. There is ongoing work in the Third Generation Partnership Project (3GPP) to add support for one or more new Radio Access Technologies (RATs) for 5G networks based on satellite access. A UE, for example, may access a satellite (instead of a terrestrial base station) and connect to a satellite earth station, which in turn would connect to a 5G Core Network (SGCN), either directly or via a terrestrial base station. The SGCN could treat the satellite system as either another type of Radio Access Network (RAN) distinct from, but also similar to, a 5G NR RAN (NG-RAN) or WLAN (WiFi) based RAN, or as another RAT, distinct from but also similar to a 5G NR terrestrial RAT.

A satellite RAN or RAT operating with a 5GCN should be able to support all regulatory services required for a wireless network. For example, a satellite RAN or RAT should be able to support emergency (EM) calls to a public safety answering point (PSAP) that is local to a calling UE, as well as support Lawful Interception (LI) and Wireless Emergency Alerting (WEA). A satellite RAN or RAT should further enable wireless coverage across multiple countries with the restriction that a UE normally connects to a 5GCN located in the country in which the UE is present, e.g., if the UE is located in country A, the UE should be connected to a 5GCN in country A. Further, the satellite RAN or RAT should enable support for EM calls, LI and WEA according to the requirements of the country in which the UE is present. It would be further advantageous if impacts to a 5GCN to support a satellite RAN or RAT are minimal.

FIG. 1 shows a diagram of a communication system 100 capable of supporting access, mobility management and regulatory services for satellite access using 5G New Radio (NR) or some other wireless access type such as Code Division Multiple Access (CDMA). The communication system 100 is illustrated as including a number of UEs 105, a number of communication satellites, also referred to as space vehicles (SVs), 115-1 to 115-7 (collectively referred to herein as SVs 115) in a Radio Access Network (RAN) 110. The RAN 110, for example, may be a Next Generation (NG) Radio Access Network (RAN) (NG-RAN) 110 or a separate satellite RAN (SRAN). Herein, RAN 110 is assumed to be an NG-RAN unless stated otherwise. The NG-RAN 110 may include a number of Satellite Node Bs (sNB) 112-1 to 112-5 (collectively referred to herein as sNBs 112), each of which may include one or more satellite ground stations 113 (also referred to as ground stations), which may act as Distributed Units (DU) using an sNB central unit (sNB-CU) 111. An sNB 112 may be referred to by other names such as a "satellite node", "satellite access node" (SRN), or NR Node B (gNB). The NG-RAN 110 may further include terrestrial base stations, such as NR Node Bs, also referred to as gNBs (not shown in FIG. 1). The sNBs 112 are not the same as gNBs although some functions may be common and a gNB may be enhanced to act as an sNB 112. For example, the sNBs 112 may provide an N2 interface to one or more Access and Mobility Management Function (AMF) in a 5G core network. The N2 interface may be the same as that supported between NG-RAN 110 and a 5G core network for terrestrial NR access by a UE 105 and may use the Next Generation Application Protocol (NGAP) defined in 3GPP Technical Specification (TS) 38.413 between an sNB 112 and an AMF in a 5G core network. The sNBs 112 may function as gateways and use ground stations 113 for transmitting signals to, and receiving signals from, one or more SVs 115 and may be referred to herein as satellite RAN nodes.

The sNBs 112 provide an N2 interface to one or more core networks in public land mobile networks (PLMN) that may be located in different countries. For example, sNBs 112-1 and 112-2 may provide an interface with a Fifth Generation (5G) core network (SGCN) in PLMN 1 117-1 in a Country 1, sNBs 112-2, 112-3, and 112-4 may provide an interface with a SGCN in PLMN 2 117-2 in a Country 2, and sNBs 112-3, 112-4, and 112-5 may provide an interface with a SGCN in PLMN 3 117-3 in a Country 3. In some implementations, countries may include one or more core networks and one or more PLMNs.

Satellite ground stations 113 may be referred to as earth stations or as non-terrestrial network (NTN) gateways. In some implementations, a ground station 113 may be separate from (and not included within) an sNB 112 and may instead connect to one or more sNBs 112. Similarly, in some implementations, an sNB 112 may not include any ground stations 113 and may instead connect to one or more ground stations 113 (e.g. using backhaul links). In such a case, an sNB 112 may correspond to a gNB that supports terrestrial NR access with extra enhancements to support satellite NR access and may then be referred to as a gNB or as an enhanced gNB.

The communication system 100 may further utilize information from positioning space vehicles 190 for a Global Navigation Satellite System (GNSS) like GPS, GLONASS, Galileo or Beidou or some other local or regional Satellite Positioning System (SPS) such as IRNSS, EGNOS or WAAS. It should be understood that positioning space vehicles 190 may not be part of the NG-RAN 110. The communication system 100 may include additional or alternative components.

It should be noted that FIG. 1 provides only a generalized illustration of various components, any or all of which may be utilized as appropriate, and each of which may be duplicated or omitted as necessary. Specifically, it will be understood that many UEs 105 (e.g., hundreds, thousands, millions, etc.) may utilize the communication system 100. Similarly, the communication system 100 may include a larger (or smaller) number of SVs 115, SVs 190, sNBs 112, PLMNs 117, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may support position determination, e.g., using communication system 100 using information from space vehicles 190 in a satellite positioning system (SPS), such as GPS, GNSS, GLONASS, Galileo or Beidou or some other local or regional Satellite Positioning System (SPS) such as IRNSS, EGNOS or WAAS. Position measurements using SPS are based on measurements of propagation delay times of SPS signals broadcast from a number of orbiting satellites to a SPS receiver in the UE 105. Once the SPS receiver has measured the signal propagation delays for each satellite, the range to each satellite can be determined and precise navigation information including 3-dimensional position, velocity and time of day of the SPS receiver can then be determined using the measured ranges and the known locations of the satellites. Information from SVs 115 in NG-RAN may also be used to support positioning. The UE 105 may further support positioning using terrestrial positioning procedures, such as Enhanced Cell ID (ECID), Round Trip signal propagation Time (RTT), multi-cell RTT, angle of arrival (AOA), angle of departure (AOD), downlink (DL) time difference of arrival (TDOA) (DL-TDOA), uplink (UL) TDOA (UL-TDOA), receive time-transmit time difference (Rx-Tx) and/or other positioning procedures.

The UE 105 may include a single entity or may include multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.)

Figure 2:
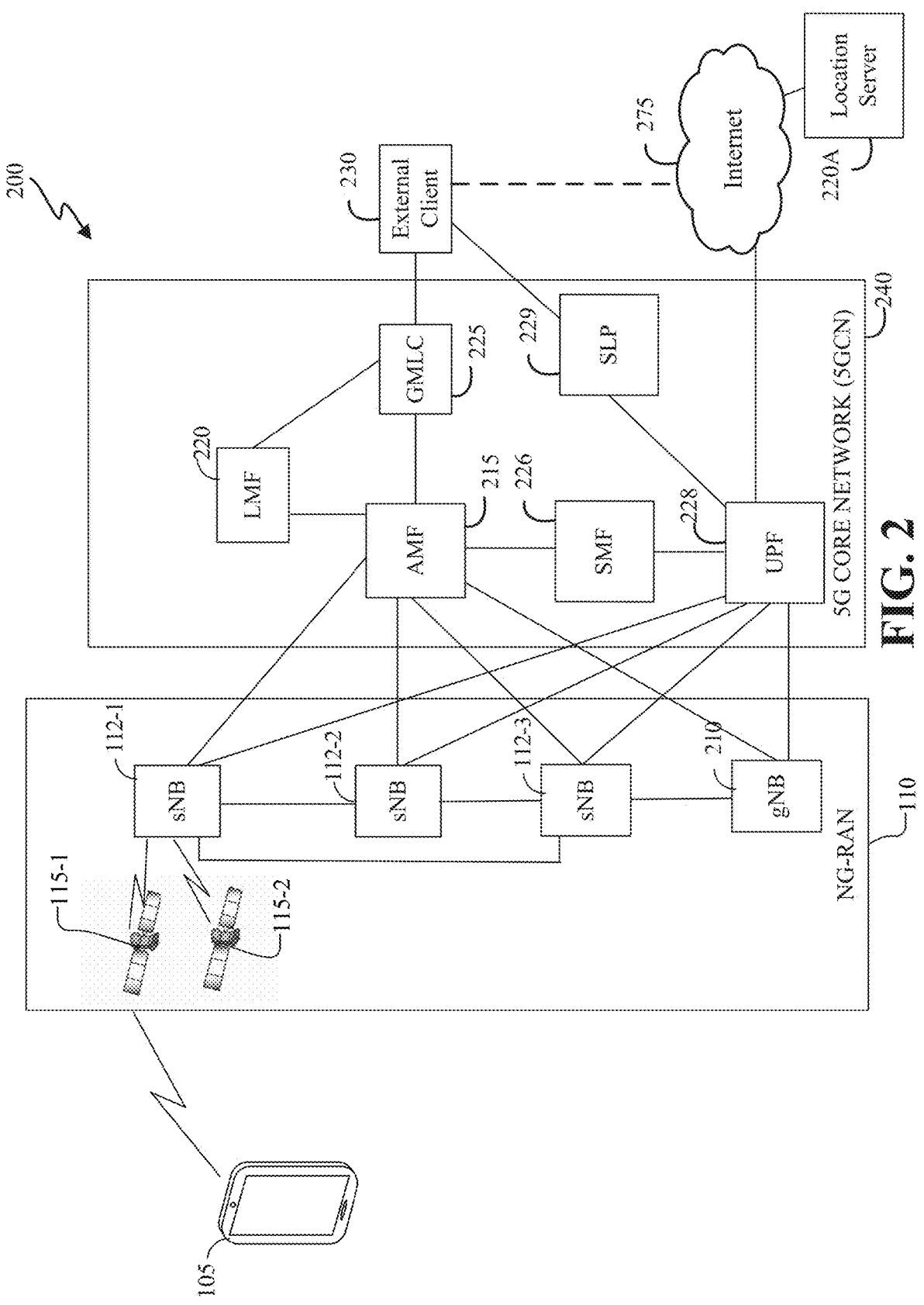
FIG. 2 shows a diagram of a communication network, which may include a portion of the communication system shown in FIG. 1.

FIG. 2 shows a diagram of a communication network 200, which may include a portion of the communication system 100 shown in FIG. 1. Here, the communication network 200 comprises the UE 105, the NG-RAN 110 with SVs 115-1 and 115-2, sNB 112-1, 112,-2, 112-3, and a gNB 210, and components of a 5G Core Network (5GCN) 240, which may be a 5GCN for any of the PLMNs 117 shown in FIG. 1. A 5G network may also be referred to as a New Radio (NR) network; NG-RAN 110 may be referred to as a 5G RAN or as an NR RAN; and 5GCN 240 may be referred to as an NG Core network (NGCN). The communication network 200 may further utilize information from positioning space vehicles shown in FIG. 1. Additional components of the communication network 200 are described below. The communication network 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication network 200. Similarly, the communication network 200 may include a larger (or smaller) number of SVs 115, gNB s 210, sNBs 112, AMFs 215, external clients 230, and/or other components. The illustrated connections that connect the various components in the communication network 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 2 illustrates a 5G-based network, similar network implementations and configurations may be used for other communication technologies, such as 3G, Long Term Evolution (LTE), future 6G, etc. Implementations described herein (be they for 5G technology or for other communication technologies and protocols) may be used to support access, mobility management and regulatory services for satellite access in a terrestrial wireless communication network.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, PDA, tracking device, navigation device, Internet of Things (IoT) device, or some other portable or moveable device. Typically, though not necessarily, the UE 105 may support wireless communication using one or more RATs such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 110 and SGCN 240), etc. The UE 105 may also support wireless communication using a Wireless Local Area Network (WLAN) which may connect to other networks (e.g. the Internet) using a Digital Subscriber Line (DSL) or packet cable for example. The UE 105 further supports wireless communications using space vehicles, such as SVs 115. The use of one or more of these RATs may allow the UE 105 to communicate with an external client 230 (via elements of SGCN 240 such as UPF 228, or possibly via a Gateway Mobile Location Center (GMLC) 225) and/or allow the external client 230 to receive location information regarding the UE 105 (e.g., via the GMLC 225).

Access to the 5G network is provided to UE 105 via wireless communication between the UE 105 and one or more of the SVs 115 in the NG-RAN 110, which may provide wireless communications access to the SGCN 240 via sNBs 112 on behalf of the UE 105 using 5G NR as defined by the Third Generation Partnership Project (3GPP). 5G NR radio access may also be referred to as NR radio access or as 5G radio access. As illustrated, pairs of sNBs 112 in NG-RAN 110 may be connected to one another—e.g. directly as illustrated or indirectly via other sNBs 112.

Base stations (BSs) in the NG-RAN 110 shown in FIG. 2 comprise NR NodeBs, also referred to as gNBs, 210. The NG-RAN 110 may include additional gNBs. Pairs of gNBs 210 in NG-RAN 110 may be connected to one another—e.g. directly or indirectly via other gNBs 210. In some implementations, as illustrated in FIG. 2, one or more sNBs 112 may be connected to one or more gNBs 210 in the NG-RAN 110. Pairs of sNBs 112 in NG-RAN 110 may be connected to one another—e.g. directly or indirectly via other sNBs 112. Access to the 5G network may be provided via wireless communication with one or more of the gNBs 210, which may provide terrestrial wireless communications access to the 5GCN 240 using 5G NR. Base stations (BSs) in the NG-RAN 110 shown in FIG. 2 may also or instead include a next generation evolved Node B, also referred to as an ng-eNB (not shown). An ng-eNB may be connected to one or more gNBs 210 and/or one or more sNBs 112 in NG-RAN 110—e.g. directly or indirectly via other gNBs 210, sNBs 112 and/or other ng-eNBs. An ng-eNB may provide terrestrial LTE wireless access and/or evolved LTE (eLTE) wireless access to UEs, as defined by 3GPP.

In some implementations, sNB 112, gNB 210 and/or ng-eNBs may support location of a UE. Some sNBs 112, gNBs 210 and/or ng-eNB in FIG. 2 may be configured to function as positioning-only beacons, which may transmit signals (e.g. PRS signals) and/or may broadcast assistance data to assist positioning of UEs 105 but may not receive signals from UEs 105.

In some implementations, SVs 115 may access 5GCN 240 through sNB 112 to support access, mobility management and regulatory services for UE 105. In some implementations, SVs 115 may support location of a UE 105—e.g. by requesting a location estimate from UE 105 acquired using an SPS, or to request location measurements, e.g., positioning measurements of PRS transmissions, from UE 105 and determining a location estimate for UE 105 using the PRS location measurements and other known information such as the locations of the antennas which transmit the measured PRS.

While FIG. 2 depicts nodes configured to communicate according to 5G NR and LTE communication protocols for an NG-RAN 110, nodes configured to communicate according to other communication protocols may be used, such as, for example, an LTE protocol for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UEs, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 110 and the EPC corresponds to 5GCN 240 in FIG. 2. The methods and techniques described herein for supporting a satellite RAN operating with terrestrial wireless communication network for UE 105 positioning may be applicable to such other networks.

As illustrated, NG-RAN 110, e.g., sNB 112-1, may connect to an Access and Mobility Management Function (AMF) 215 in the 5GCN 240. The SVs 115 and sNB 112 can communicate with AMF 215, which, for positioning functionality, may communicate with a Location Management Function (LMF) 220 and/or a Location Management Component (LMC) in NG-RAN 110 (not shown in FIG. 2). The AMF 215 may support mobility of the UE 105, including terrestrial cell change, satellite cell change and handover and may participate in supporting a signaling connection to the UE 105 and possibly data and voice bearers for the UE 105. The LMF 220 or LMC may support positioning of the UE 105 when UE accesses the NG-RAN 110 and may support position procedures/methods such as Assisted GNSS (A-GNSS), Observed Time Difference of Arrival (OTDOA), Real Time Kinematic (RTK), Precise Point Positioning (PPP), Differential GNSS (DGNSS), ECID, RTT, multi-cell RTT, AOA, AOD, DL-TDOA, UL-TDOA, Rx-Tx and/or other positioning procedures. The LMF 220 or LMC may also process location services requests for the UE 105, e.g., received from the AMF 215 or from the GMLC 225. The LMF 220 or LMC may be connected to AMF 215 and/or to GMLC 225. It is noted that in some embodiments, at least part of the positioning functionality (including derivation of a UE 105's location) may be performed at the UE 105 (e.g., using signal measurements obtained by UE 105 for signals transmitted by positioning space vehicles 190, shown in FIG. 1, as well as SVs 115, wireless nodes such as gNBs 210 and ng-eNB, and assistance data provided to the UE 105, e.g. by LMF 220).

The Gateway Mobile Location Center (GMLC) 225 may support a location request for the UE 105 received from an external client 230 and may forward such a location request to the AMF 215 for forwarding by the AMF 215 to the LMF

220. A location response from the LMF 220 (e.g. containing a location estimate for the UE 105) may be similarly returned to the GMLC 225 either directly or via the AMF 215, and the GMLC 225 may then return the location response (e.g., containing the location estimate) to the external client 230.

A User Plane Function (UPF) 228 may support voice and data bearers for UE 105 and may enable UE 105 voice and data access to other networks such as the Internet 275. UPF 228 functions may include: external Protocol Data Unit (PDU) session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 228 may be connected to gNBs 210, sNBs 112 and possibly to a Secure User Plane Location (SUPL) Location Platform (SLP) 229 to enable support of location of UE 105 using the SUPL location solution defined by the Open Mobile Alliance (OMA). SLP 229 may be further connected to or accessible from external client 230.

As illustrated, a Session Management Function (SMF) 226 connects to the AMF 215 and the UPF 228. The SMF 226 may have the capability to control both a local and a central UPF within a PDU session. SMF 226 may manage the establishment, modification and release of PDU sessions for UE 105, perform IP address allocation and management for UE 105, act as a Dynamic Host Configuration Protocol (DHCP) server for UE 105, and select and control a UPF 228 on behalf of UE 105.

The external client 230 may be connected to the core network 240 via the GMLC 225, the SLP 229 and/or the UPF 228. The external client 230 may optionally be connected to a location server 220A, which may be, e.g., an SLP, that is external to SGCN 240, via the Internet 275. The external client 230 may be a server, a web server, or a user device, such as a personal computer, a UE, etc.

As noted, while the communication network 200 is described in relation to 5G technology, the communication network 200 may be implemented to support other communication technologies, such as GSM, WCDMA, LTE, future 6G, etc., that are used for supporting and interacting with mobile devices such as the UE 105 (e.g., to implement voice, data, positioning, and other functionalities).

The SGCN 240 may treat the NG-RAN 110 as another type of RAN distinct from, but also similar to, a 3GPP NG-RAN for terrestrial NR wireless access or as a WLAN (WiFi) based RAN. The SGCN 240 may instead treat the NG-RAN 110 the same as, or almost the same as, a 3GPP NG-RAN for terrestrial NR wireless access and may then treat sNBs 112 as providing a new RAT associated with satellite 5G NR access. It is desirable, however, that the NG-RAN 110 is able to support all regulatory services including emergency (EM) calls to a PSAP local to and in the same country as the UE 105, Lawful Interception (LI) in the same country as the UE and Wireless Emergency Alerting (WEA) by the country in which UE 105 is located. Additionally, the NG-RAN 110 may need to enable satellite wireless coverage across multiple countries with the restriction that a UE 105 in a country is normally connected to a 5GCN in the same country as the UE 105 and receives support for EM calls, LI and WEA according to the requirements for that country.

In one implementation to support use of NG-RAN 110 with a core network, such as 5GCN 240, a set of "virtual cells" (also referred to as "logical cells", "earth fixed cells" or "fixed cells") and Tracking Areas (TAs), which are fixed and may be virtual or based on existing terrestrial tracking areas, across the coverage area of a satellite network may be used. Unlike a radio cell (e.g. a radio cell supported by a terrestrial base station such as gNB 210), a virtual cell may not be associated with a terrestrial base station (or a specific SV 115) or with the radio coverage of a terrestrial base station (or SV 115). A virtual cell is instead a fixed geographic area that is defined artificially, e.g., by a network operator. A virtual cell may have a defined geometric shape, such as a square, circle or a polygon, e.g., a hexagon, with a defined size, e.g., with a size ranging from a few meters to a few kilometers in any direction. Similarly, a TA may be virtual and may comprise a set of contiguous virtual cells, in a similar manner that a TA for terrestrial wireless access comprises a set of contiguous radio cells (e.g., associated with a terrestrial base station), or the TA may be an existing terrestrial based TA for terrestrial NR access through gNBs 210. Virtual cells and virtual TAs within the same country may all be assigned to a PLMN that is specific to the country. Virtual tracking areas may also be referred to as fixed tracking areas, earth fixed tracking areas or just as tracking areas.

Virtual cells and virtual TAs may be defined using a set of grid points, where each grid point is associated with one cell. Each grid point may be specified, e.g., by latitude and longitude. As an example, with the shape and size of each cell defined, each grid point could be defined to lie at the center (or center of gravity) of an associated virtual cell. To avoid explicitly defining the size and shape of each virtual cell, the areas of the virtual cells associated with the set of grid points may be defined by a simple test: any location L is within a virtual cell associated with a grid point G if L is closer to G than to any other grid point. Data defining the grid points (and virtual cell shapes and sizes if defined explicitly) and the associated virtual TAs and associated PLMNs may then be periodically broadcast by the satellite system, e.g., SVs 115. A UE 105 may periodically obtain its own location, e.g. using an SPS, which may be accurate and easy to obtain in the types of outdoor environment in which a satellite network, e.g., NG-RAN 110, could be used, and then determine which virtual cell it is located in, e.g., by reference to the broadcast grid points and other virtual cell and virtual TA data. The UE 105 may also determine the virtual TA and PLMN associated with the virtual cell in which the UE 105 is located. Support of mobility by the UE 105 may then proceed similarly to that for access to a terrestrial cellular network. For example, the UE 105 may perform a Registration with serving SGCN 240 whenever its virtual TA has changed and would register in a different SGCN whenever a virtual TA and country change had occurred. From a SGCN perspective, the mobility support may be identical or almost identical to that for a terrestrial cellular (NR or LTE) RAN or RAT, thereby reducing SGCN impacts, because the SGCN may treat the UE 105 as having a serving cell and serving TA, which are fundamental to SGCN mobility procedures.

Figure 3:
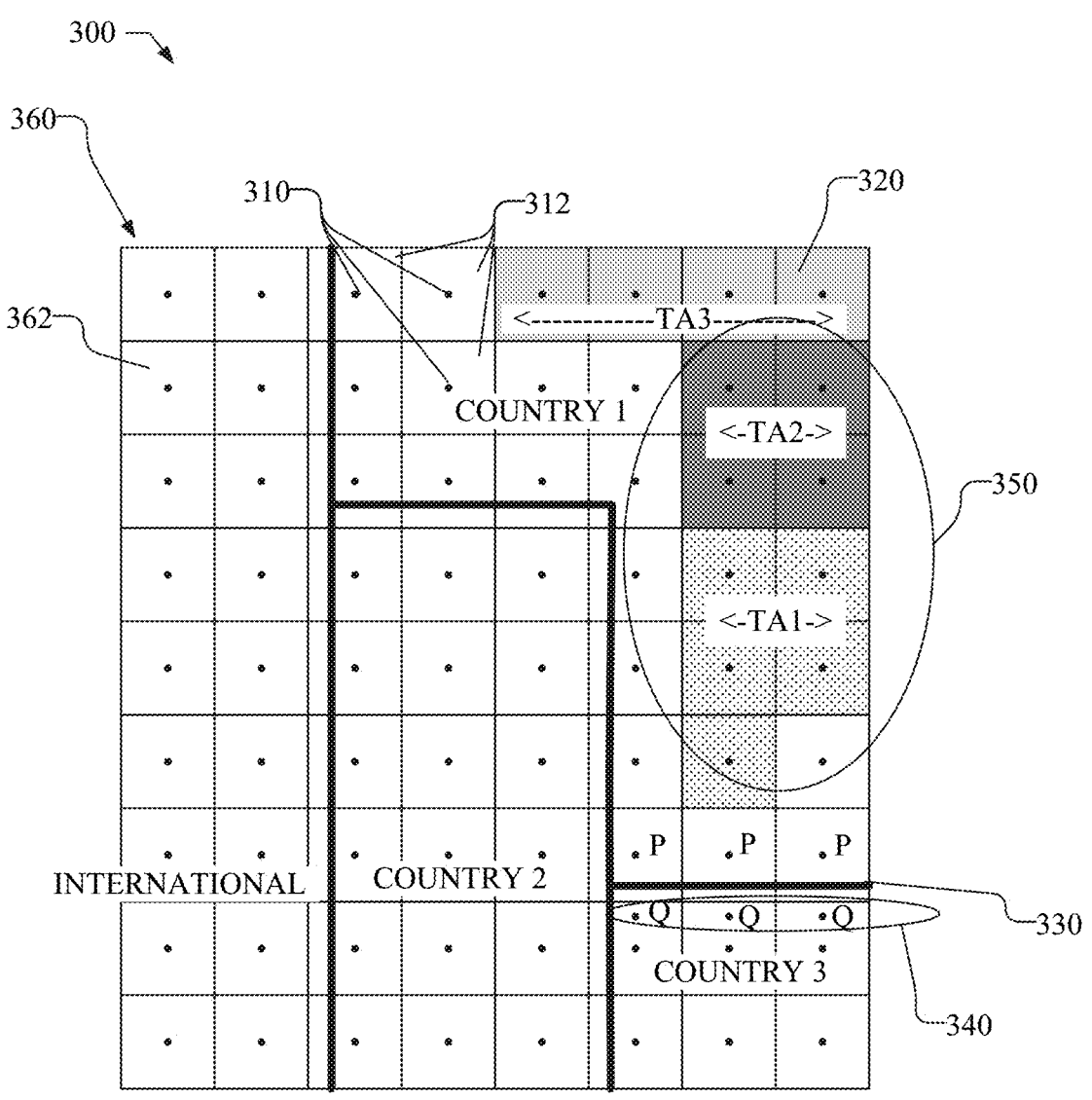
FIG. 3 is a diagram illustrating the use of rectangular virtual cells defined by plurality of grid points over a geographic area that includes a number of countries and international waters.

FIG. 3 is a diagram 300 illustrating the use of virtual cells defined by a plurality of grid points over a geographic area that includes a number of countries and an international area (e.g. international waters or a polar region). As illustrated in FIG. 3, grid points 310 may be defined in rows and columns. The grid points 310 may be specified, e.g., by latitude and longitude, where each grid point 310 defines a virtual cell 312. The size and shape of the virtual cells 312 may be defined, e.g., based on the orientation and distance between the grid points 310. For example, each grid point may be defined to lie in the center of an associated virtual cell. The area of a virtual cell associated with a grid point G may be defined simply as including any location L that is closer to grid point G than any other grid point. As illustrated, the resulting virtual cells 312 in FIG. 3 may be rectangular or square.

FIG. 3 illustrates tracking areas 320 (TA1, TA2, and TA3), which may be virtual and defined as a set of contiguous virtual cells, or may be based on existing terrestrial tracking areas. TAs may be included in the data that is periodically broadcast by one or more SVs 115. For example, a set of grid points that define a set of contiguous virtual cells associated with a TA may be explicitly included in the data. Additionally, the PLMNs that are associated with the virtual cells may be included in the data that is periodically broadcast by one or more SVs 115. Moreover, the virtual cells may be associated with different countries, e.g., Country 1, Country 2, or Country 3, which may be included in the data that is periodically by broadcast one or more SVs 115. FIG. 3 additionally illustrates the coverage area 350 of a satellite 115, which includes tracking areas TA1 and TA2, and only a small portion of tracking area TA3. Data provided for the satellite 115 (e.g. data broadcast by the satellite 115 to a UE 105 in a System Information Block (SIB)) may include and/or indicate tracking areas TA1 and TA2, but may exclude and/or not indicate tracking area TA3 because most tracking area TA3 is not present in the coverage area 350.

Figure 4:
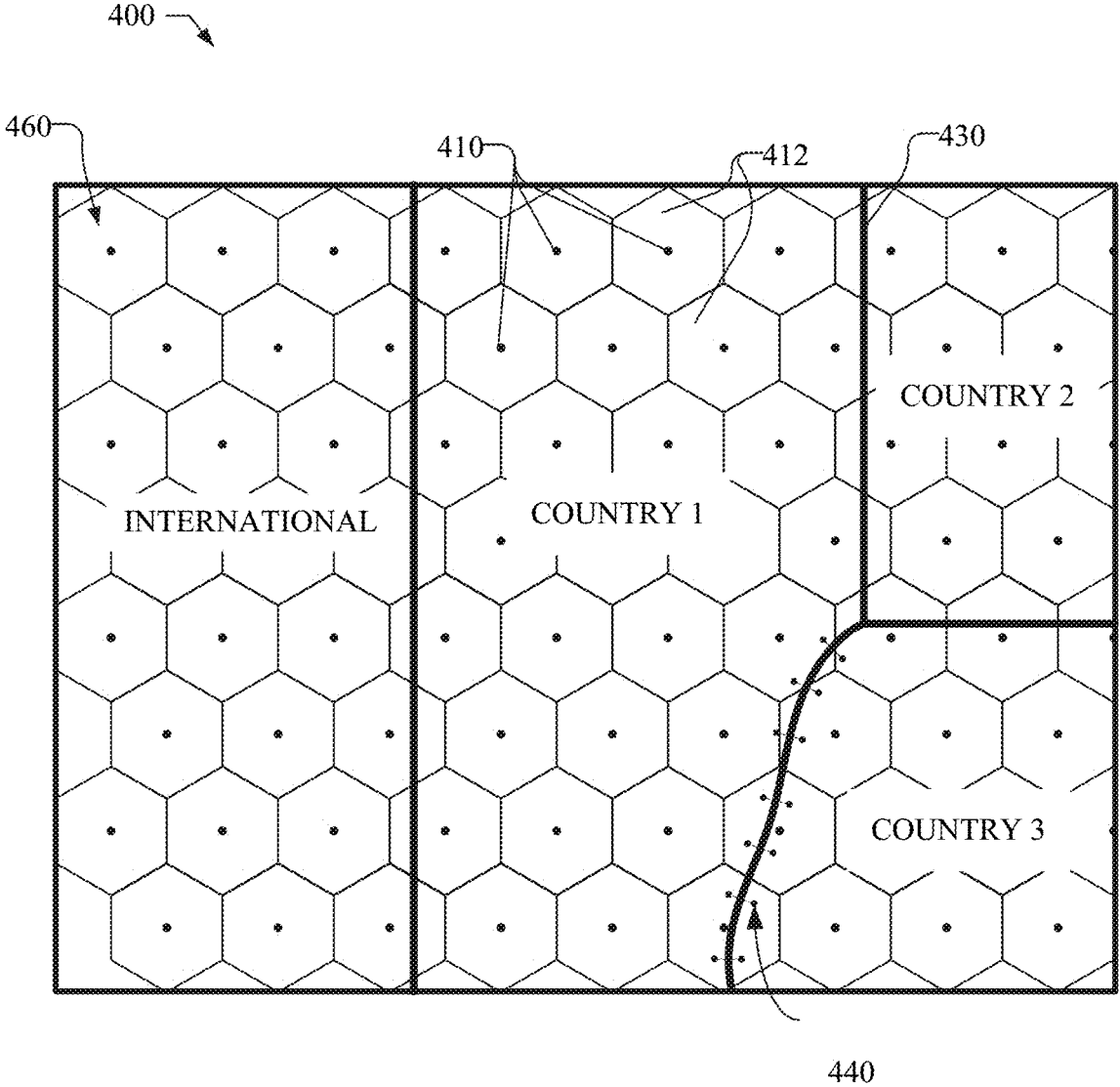
FIG. 4 is a diagram illustrating the use of hexagonal virtual cells defined by plurality of grid points over a geographic area that includes a number of countries and international waters.

FIG. 4 is a diagram 400, similar to the diagram 300 shown in FIG. 3, that illustrates the use of virtual cells defined by plurality of grid points over a geographic area that includes a number of countries and international waters. As illustrated in FIG. 4, grid points 410 may be defined in rows and columns, with the grid points 410 in each row offset relative to a previous row by half of the distance between columns. The grid points 410 may be defined to lie in the center of an associated virtual cell 412, wherein the size and shape of the virtual cells 412 may be defined, e.g., based on the orientation and distance between the grid points 410. As illustrated in FIG. 4, the resulting virtual cells 412 from the array of grid points 410 are hexagonal.

The grid points 410 and virtual cells 412 may be specified and compressed as described in reference to FIG. 3. For example, the grid points 410 may be specified, e.g., by latitude and longitude. Data defining a set of grid points 410, which may be periodically broadcast by one or more SVs 115 using one or more SIBs, may be compressed, e.g., by including only a grid point spacing distance (or distances), a grid orientation, the number of grid points in each of two directions, and a reference grid point location. An implicit set of identifiers may be provided for the set of grid points, e.g., based on the grid point ordering. For example, the implicit identifiers may be based on a reference grid point and known or broadcast offset values. In another implementation, e.g., where the grid points 410 in a set of grid points are explicitly listed in the broadcast data, identifiers for the set of grid points may be listed separately but in the same order as the associated grid points or listed paired with associated grid points.

Additional information, such as a virtual TA, e.g., which may be defined as a set of contiguous virtual cells, or an existing terrestrial TA may be included in the data that is periodically broadcast by one or more SVs 115. Additionally, the PLMNs that are associated with the virtual cells may be included in the data that is periodically broadcast by one or more SVs 115. Moreover, the virtual cells may be associated with different countries, e.g., Country 1, Country 2, or Country 3, which may be included in the data that is periodically broadcast one or more SVs 115.

In some implementations, a virtual TA may be defined using a set of grid points, where each grid point defines one virtual TA which may include all locations that are closer to the grid point than to any other grid point. This type of virtual TA may be defined and supported as described above and below for virtual cells with reference to FIGS. 3 and 4, with the difference that groups of virtual TAs are not included in other TAs (as described above for virtual cells) and that a virtual TA may include virtual cells that may be defined using a different set of grid points (e.g. with a smaller inter-grid point spacing) than the set of grid points used to define the virtual TA.

Data defining grid points, as well as virtual cell (and virtual TA) shapes and sizes if defined explicitly, and the associated virtual cells, virtual TAs and PLMNs may be periodically broadcast by the SVs 115. A UE 105 may determine which virtual cell (or which virtual TA) it is located in by obtaining its position, e.g., using SPS, and determining the closest grid point. The UE 105 may perform a Registration with the PLMN associated with the virtual cell (or virtual TA) in which the UE 105 is located. The UE 105 may periodically update its location and register with a different PLMN when required by a change in the virtual cell, virtual tracking area, or country.

The UE 105 may support Emergency (EM) calls, Lawful Interception (LI) and Wireless Emergency Alerting (WEA) using the virtual cells and virtual TAs. For an EM call, the UE 105 may include the identifier for the serving virtual cell, e.g., the virtual cell in which the UE 105 is located, in a Session Initiation Protocol (SIP) INVITE request, in a similar manner as including a terrestrial cell ID when connected to a terrestrial base station. The serving virtual cell ID can be used by the serving SGCN 240 to route the EM call to a public safety answering point (PSAP) associated with the serving virtual cell in the same way as for an EM call from a UE in a terrestrial radio cell. To ensure correct PSAP routing, virtual cells may be defined so that most or all of any virtual cell area is within the serving area of just one PSAP.

For LI, the 5GCN 240 can include a virtual cell ID as part of LI data collected for the UE 105, in a similar manner as including a terrestrial radio cell ID in the case of cellular NR or LTE coverage, and/or can report LI data for the UE 105 whenever the UE 105 moves into a new virtual cell and/or new virtual TA.

For WEA, the 5GCN 240 may assign WEA messages to one or more virtual cells, in a similar manner as assigning WEA messages to one or more terrestrial radio cells, and the SVs 115 of the NG-RAN 110 may broadcast the WEA messages and include in each WEA message the IDs of applicable virtual cells. Alternatively, the SVs 115 of the NG-RAN 110 may broadcast a list of applicable WEA message IDs for each virtual cell ID (and broadcast the WEA messages and their associated WEA message IDs separately). Either way, when moving into a new virtual cell, the UE 105 may verify if the new virtual cell is associated with any WEA messages that need to be provided to the user of UE 105.

System Information Blocks (SIBs) may be defined and broadcast for the different virtual cells, for example, a SIB may indicate or contain WEA messages. Additionally, SIBs may be common to many virtual cells and only be broadcast once for all virtual cells.

In case of proximity to a country border, the UE 105 may need to determine in which country it is located in order to select a virtual cell and/or virtual TA belonging to the appropriate country. For example, the UE 105 might be nearest to a grid point in a different country but should still select a virtual cell associated with a grid point in its own country even if the grid point is farther away. To enable this, the UE 105 may select a virtual cell by first determining the country in which the UE 105 is located and then select a virtual cell associated with the closed grid point in the same country. Country determination may be possible by the UE 105 based on a UE location if extra data is broadcast by an SV 115 (or provided in some other way to UE 105 such as from an Internet server or by a home PLMN for the UE 105) to define a border region (e.g. a sequence of straight line segments), such as borders 330 or 430 shown in FIGS. 3 and 4. If grid points are defined such that the closest grid point to any location is always in the same country as that location (e.g., by aligning a border between countries with a border between pairs of virtual cells), then the UE would not need to separately determine the country in which it is located. For example, additional grid points may be added on one or both sides of a border to ensure that the closest grid point to a UE 105 is in the same country as the UE 105. For example, as illustrated in FIG. 3, where a border is a straight line, grid points may be defined in pairs along the straight line border 330, where each pair of grid points comprises a point P on one side of the border and an additional point Q added on the other side, where the line PQ is perpendicular to the (straight line) border 330 with P and Q equidistant from the border. In this example, grid points Q 340 are added and may be used to determine a country of UE 105 and a virtual cell. In another example shown in FIG. 4. pairs of grid points 440 may be added along both sides of a border that are equidistant from the border. In these examples, the additional grid points 340 and 440 may be defined such that the closest grid point to any location is in the same country as that location. The UE 105 may then determine the closest grid point (e.g. 340 or 440) to determine in which country it is located.

The data needed to define grid points (and additional grid points), virtual cells, virtual TAs, PLMNs, and country IDs if included, may be broadcast once for all virtual cells by SVs 115. The data needed to define grid points (and additional grid points), virtual cells, TAs, PLMN (and country) IDs may be compressed in different ways. The compression may avoid excessive data broadcast and reduce latency in data acquisition. In one implementation, for example, a rectangular array of grid points, e.g., grid points 310 shown in FIG. 3, can be defined by including only the grid point spacing distance(s), grid orientation, the number of grid points in each of two directions, and one reference grid point location, e.g., provided in latitude and longitude. Grid points may have an implicit set of grid point identifiers (IDs) according to some implicit grid point ordering, e.g., ordering via rows and then columns. Virtual cell IDs for grid points may be listed and broadcast in the same order as their associated grid points and/or may be defined and broadcast as pairs of grid point ID and virtual cell ID. Virtual cell IDs may change in predictable ways and, thus, may not need to be explicitly provided via broadcast. For example, a virtual cell ID might be a function of a known base ID plus some offset value derived from a grid point ID, e.g., the grid point ID itself. Virtual TAs might be defined, e.g., using bit maps that indicate virtual cell IDs that are contained within the virtual TA.

Additionally, virtual cells may be used to support areas that are not in any country. For example, as illustrated in FIGS. 3 and 4, the virtual cells 310/410 of Country 1 (and/or of Country 2 in FIG. 3) may extend to the international waters 360/460. Thus, virtual cells in international waters may be used by UE 105 if the UE 105 is over or on international waters in a plane or ship. For this, virtual cells and virtual TAs may be defined over international areas as illustrated in FIGS. 3 and 4. Which PLMN would act as a serving PLMN when a UE 105 is on international waters may be controlled based on prior agreement. For example, the serving PLMN may be the home PLMN (HPLMN) for a UE 105 or the last serving visited PLMN (VPLMN) for a UE 105. Based on the prior agreement, the UE 105 may detect its location in an international virtual cell 362 and would register with the appropriate PLMN. In another implementation, a satellite sNB 112 might make the determination of which PLMN to register with if the UE 105 provides its last serving VLMN ID and/or HPLMN ID.

The support for access, mobility management and regulatory services for satellite access in 5G, as described herein, may minimize SGCN impact by presenting UE 105 access as being provided from fixed cells and fixed TAs similar to existing access for terrestrial NR and terrestrial LTE, may confine mobility aspects of satellite access for a UE 105 caused by movement of a non-geostationary (NGSO) satellite to the NG-RAN 110, and may support regulatory requirements (e.g. emergency services, lawful intercept (LI) and wireless emergency alerts (WEA)) in the same manner as for terrestrial NR access from the perspective of a SGCN and external clients.

PLMN operators may divide a coverage area (e.g. for an entire country, a region or multiple countries) into fixed virtual cells with well-defined geographic boundaries just as for normal cellular operation, e.g., as illustrated in FIGS. 3 and 4. The cells are virtual and do not correspond to actual RF coverage from any satellites or to existing cells for terrestrial NR access. The virtual cells may be defined with reference to an array of grid points, as shown in FIG. 3 for a rectangular array defining square or rectangular cells and in FIG. 4 for a hexagonal array (with alternately staggered rows and columns) defining hexagonal cells. A serving virtual cell for any UE may then be defined by the virtual cell associated with the grid point that is closest to the current UE location.

Virtual cells may be grouped into virtual TAs which may include only virtual cells or may be assigned to existing terrestrial TAs in areas where these are defined. A benefit of virtual TAs may be that paging of a UE in a Connection Management (CM) IDLE state may be restricted to either sNBs 112 and satellites 115 only or terrestrial gNBs 210 only when the current TA for a UE 105 is either a virtual TA or an existing terrestrial TA, respectively. A benefit of existing terrestrial TAs is that a UE in CM IDLE state may camp on either a 5G satellite 115 or a terrestrial gNB 210, and may move from one to other, without needing to reregister with the SGCN 240. Thus, it may be advantageous if both alternatives can be supported by PLMN operators.

Grid point locations (e.g. latitude/longitude) may be broadcast by satellites 115 (e.g. using a System Information Block (SIB) or a Satellite System Information Block (SSIB)) together with their associated virtual cell IDs, tracking area IDs (TAIs) and PLMN IDs (e.g., Mobile Country Code (MCC) plus Mobile Network Code (MNC)). The information may be compressed when inter-grid point spacing and orientation remains fixed and when virtual cell IDs and TAIs (in the case of virtual TAs) change in simple predictable ways (e.g., where cell IDs change by fixed increments between adjacent grid points).

A UE 105 may periodically obtain its location and determine a serving virtual cell by association with the closest grid point. Due to the necessity for good satellite signal reception, UEs may normally be outdoors and able to use accurate GNSS based location—though can supplement this using inertial sensors and RAT dependent location including from NR, LTE and future (to be developed) 5G satellite positioning. When a UE 105 is close to an international border, the UE 105 may first determine the country (e.g. if additional information is broadcast by a satellite defining the locations of an international border) and then determine the closest grid point in the same country. This two step process can be reduced to one step if extra grid points are assigned to each virtual cell on one or both sides of a border as illustrated previously for FIGS. 3 and 4 (e.g. grid points on either side of and equidistant from a border at say 100-500 meter intervals). In this case, the closest grid point to a UE 105 will generally be in the same country as the UE 105. The grid points and associated virtual cells and virtual TAs can be extended to cover international areas, e.g., 360 and 460 in FIGS. 3 and 4, such as oceans and polar regions. The virtual cells and virtual TAs in the international case may be associated with a nearby country and/or with the home country of any UE 105 (e.g. using special mobile country code (MCC) and mobile network code (MNC) code pairs to signify the home PLMN of any UE 105).

Virtual cells and virtual TAs can also be associated with several PLMNs just as for real, i.e., terrestrial, 5G radio cells and TAs, to permit sharing of one sNB 112 by multiple PLMNs. Because different PLMNs may prefer to use different cell IDs and TA IDs (TAIs), sharing of multiple PLMNs may follow one of three alternative options. In an Option 1, a common set of virtual cells and virtual TAs (with associated common cell IDs and TAIs) may be shared by all PLNMs with only the PLMN MNCs (and possibly MCCs) being different. In an Option 2, a common set of virtual cells (defined by grid points) may be shared by all PLMNs but cell IDs and/or TAIs are different for each PLMN. In an Option 3, each PLMN may have its own set of virtual cells (defined by distinct sets of grid points) and associated own sets of cell IDs and TAIs. UE access and mobility can still be supported as described elsewhere herein, but for Options 2 and 3, a UE 105 could first select a PLMN prior to determining a current serving cell and TA.

Each satellite 115 (when providing coverage to a supported PLMN area) may have radio access to a single ground station 113 for one sNB 112 or to several ground stations 113 for one or more sNBs 112, directly or using Inter Satellite Links (ISL). This association can be fixed for geostationary (GEO) satellites 115 and dynamic for non-geostationary (NGSO) satellites 115 with sNBs 112 interacting to manage the transfer of each satellite 115 between ground stations 113 and sNBs 112. Each satellite 115 may broadcast (e.g. in an SSIB) its currently associated sNB 112 identity or identities, the locations of ground stations 113 for the sNB(s) 112 which are accessible from the satellite 115, and a list of the virtual TAs 320 and corresponding PLMNs which are currently in coverage 350 from the satellite 115. To avoid providing sensitive ground station location data, a ground station location 113 may be defined approximately via a virtual cell ID. For any satellite 115, a PLMN operator may choose to indicate coverage of virtual TAs which are wholly or mostly included in the current satellite 115 radio footprint and exclude virtual TAs which are not included or mostly not included (e.g. as shown by the example for TAs TA1, and TA2 (included in coverage 350) and TA3 (excluded from coverage 350) in FIG. 3). For an NGSO satellite 115, this information may change as the satellite 115 moves and may be recalculated periodically by an sNB 112 based on satellite orbital data which may be preconfigured in the sNB 112.

A UE 105 accessing the NG-RAN 110 via 5G satellite coverage for the first time may find or select an available satellite 115 (or an available radio cell for a satellite 115), and may receive data broadcast by the satellite 115 (e.g. in a radio cell) providing information for virtual cells, virtual TAs, sNBs 112 and PLMNs. The UE 105 may also determine its location (e.g. using GNSS) and may then determine its current serving virtual cell, virtual TA and a preferred PLMN and may select an sNB 112 for the selected PLMN with the closest accessible ground station 113 to the UE 105 location (since minimal distance to a ground station may also increase the period of coverage by the selected satellite). The UE 105 then performs registration with the selected PLMN via the selected sNB 112. Information for the virtual cells and their TAs may only need to be received once, which may restrict latency impacts to just the first access.

While the UE 105 remains in a CM CONNECTED state, the UE 105 may perform intra-sNB 112 handovers between satellites 115 under the control of the serving sNB 112, which can be transparent to the SGCN 240. This may operate in a similar manner to terrestrial cellular handover for NG-RAN. The UE 105 may provide periodic measurements of visible satellites 115 and possibly different radio beams (also referred to as beams) for each satellite 115 to the serving sNB 112. Measurements for terrestrial gNBs 210 may also be provided to the serving sNB 112. The serving sNB 112 then determines a new satellite 115 or a new satellite 115 beam for the UE 105 based on handover related objectives for the new satellite 115 or new satellite 115 beam. The handover related objectives may include: (i) improved signal reception at the UE 105 compared to a previous satellite 115 or previous satellite 115 beam; (ii) for a new NGSO satellite 115, favorable coverage for the current UE 105 location at current and later times, based on known satellite 115 orbital data, as the satellite 115 (or satellite 115 beam) coverage footprint moves across the current UE location; and (iii) an ability to access a new satellite 115 from a ground station 113 for the serving sNB 112 (as well as from the UE 105).

For a geostationary (GEO) satellite 115, only the first handover related objective may need to be evaluated. For an NGSO satellite 115, all handover related objectives may need to be evaluated since failure to support any one of them could lead to effective loss of UE 105 coverage. As an example, a UE 105 in a valley or next to a hill or large building might fail to receive coverage from a satellite 115 which only satisfied handover related objectives (ii) and (iii). The handover support can be extended by including UE 105 measurements for terrestrial gNBs 210 and by supporting handover between an sNB 112 and terrestrial gNB 210.

When the UE 105 goes into a CM IDLE state, the UE 105 may camp on any satellite 115 (and any satellite 115 beam or radio cell) which has good signal reception at the UE 105, if the satellite 115 indicates coverage for the current virtual TA for the UE 105 (or at least one virtual TA in the current set of allowed virtual TAs for the UE 105). The UE 105 may be allowed to camp on any new satellite 115 or any new satellite 115 beam or radio cell due to movement of the UE 105 or satellite 115 without network interaction as long as the new satellite 115 (or new satellite 115 beam or radio cell) indicates coverage for the current virtual TA for UE 105 (or at least one virtual TA in the current set of allowed virtual TAs for UE 105). The UE 105 periodically determines its current virtual cell as described above. A UE 105 may perform a new registration when moving into a new virtual TA. In order to page a UE 105 in CM IDLE state, the serving AMF 215 may send a paging request to all sNBs 112 supporting the current virtual TA for UE 105. Each of these sNBs 112 may then broadcast the paging request via all satellites 115 with coverage of this virtual TA. As an option, a PLMN could allow a UE 105 to assume being in the same virtual TA even when the UE 105 physically moves out of the virtual TA without needing to re-register with the PLMN—except when a periodic registration time expires. With this option, the PLMN can still page the UE 105 using a previous virtual TA as long as the UE 105 remains camped on a satellite 115 with coverage for this previous virtual TA. However, to support WEA and movement into coverage of a different PLMN or different country, a UE 105 may still need to periodically determine its current virtual cell.

When the UE enters a virtual TA for a new PLMN, the UE 105 may register with the new PLMN and may disconnect from (e.g. deregister from) an old PLMN. The UE 105 may also change from one satellite beam or radio cell to another if there is a requirement that any satellite beam or radio cell is only used within one country.

SNBs 112 may track an NGSO satellite 115 movement and change of virtual cell and virtual TA coverage and update a list of sNB 112 IDs, ground station 113 locations, virtual TA IDs and PLMN IDs broadcast by the satellite 115.

To support UEs which do not have an accurate location capability and to reduce initial NG-RAN access delay for a UE with accurate positioning capability, a serving sNB 112 may position a UE 105 and determine a current virtual cell and virtual TA for the UE 105. With this arrangement, a UE 105 may select a satellite 115 with good signal reception which provides access to a preferred PLMN, and establishes a signaling connection with an sNB 112 associated with this PLMN and accessible from this satellite 115. The sNB 112 then positions the UE 105 (e.g. using measurements of timing advance to the current satellite 115 and/or other satellites 115 and measurements of received signal power and/or AOA at the UE 105 and/or at the sNB 112). The positioning only needs to determine a current TA for the UE 105 initially, although cellular accuracy may be useful or necessary later for some regulatory services. The sNB 112 then returns the TA to the UE 105, allowing the UE 105 to perform an initial or new registration. While the UE 105 remains in a CM CONNECTED state, the sNB 112 can control UE handover to new satellites 115 as described above. When the UE 105 enters CM IDLE state, the UE 105 can assume that it remains within the current virtual TA even if that is not the case, since the current virtual TA can be mainly used to determine when to reregister and to page the UE 105, both of which can continue to work even when the UE 105 leaves the current virtual TA. When the UE 105 again establishes a signaling connection with an sNB 112 (e.g. to reregister), the sNB 112 can again position the UE 105 and assign a new virtual TA. However, in order to support WEA and determine if a UE 105 has moved into a new PLMN area or new country, a UE 105 without positioning capability may need to establish an association (e.g. signaling connection) with an sNB 112 periodically in order to have the sNB 112 determine the current UE 105 location and associated virtual cell ID and virtual TA. However, such interaction could be reduced for UEs 105 that are well within a country and PLMN serving area and may only need to be frequent for UEs 105 close to the border of a PLMN or country.

The solution as described above can support UE 105 mobility in the same manner as for terrestrial NR cellular access from the perspective of a SGCN 240, which should minimize new SGCN 240 impacts. In addition, the solution can support regulatory services the same as for NG-RAN terrestrial cellular access.

For example, for an emergency services call, a UE 105 may include a current virtual serving cell ID in a SIP INVITE request sent to an IP Multimedia Subsystem (IMS) in a serving PLMN. The IMS can use the virtual serving cell ID to route the emergency services call to a local PSAP and as an initial approximate UE location. A PLMN operator can arrange for virtual cell areas to be small enough to be normally contained within the serving area of one PSAP—thereby defining the routing.

For lawful interception (LI), a 5GCN 240 can include a virtual cell ID as part of the LI data collected for a UE 105 which may enable an LI client to treat data collected for 5G satellite access the same as data collected for NR or LTE terrestrial access. Triggers can also be set up for LI based on UE change of virtual serving cell ID or entry into or exit from an area of interest composed of a number of virtual cells. For example, the NGAP Location Reporting Control procedure in 3GPP Technical Specification (TS) 23.502 can be used between a serving AMF 215 and serving sNB 112 to collect LI related location data for a UE 105.

For WEA, a 5GCN 240 can assign WEA messages that are received from a Government or other authority to one or more virtual cells in the same way as WEA messages are assigned to real radio cells for NR and LTE terrestrial access. The WEA messages can then be broadcast in a SIB or SSIB in association with the assigned virtual cells. Three options for broadcast would be possible. In a first option, a SIB or SSIB is broadcast by a satellite 115 for each virtual cell in each virtual TA within the current coverage area of the satellite 115. This virtual cell associated SIB contains one or more WEA messages that have been assigned to that virtual cell. In a second option, a single SIB or SSIB broadcasts all WEA messages for all virtual cells within the current coverage area of a satellite 115. Each WEA message includes the specific virtual cell IDs for which it is applicable. In a third option, all WEA messages are broadcast one time only in a common SIB (or SSIB) with a reference ID for each WEA message. For each virtual cell, there is a separate broadcast (e.g. SSIB) containing the WEA reference IDs applicable to that virtual cell. The first option is analogous to current WEA support for real, terrestrial, cells but may be inefficient. The second option may be more efficient but may increase UE 105 impacts. The third option may be in between the first and second options.

Figure 5:
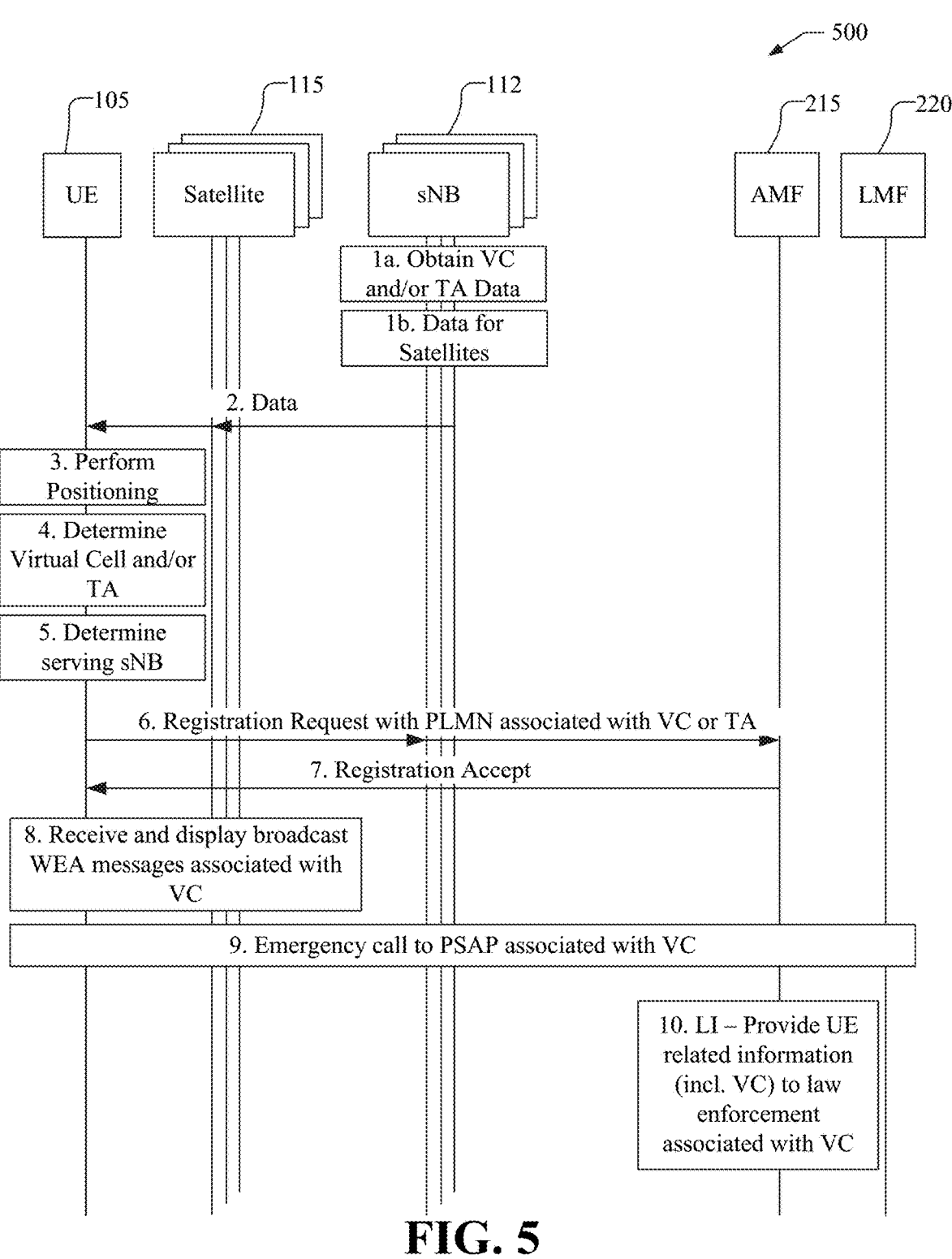
FIG. 5 shows a signaling flow that illustrates various messages sent between components of a communication system that supports access, mobility management and regulatory services for satellite access in 5G NR.

FIG. 5 shows a signaling flow 500 that illustrates various messages sent between components of the communication network 200 depicted in FIG. 2. FIG. 5 illustrates a procedure for a satellite RAN 110 to operate with a 5GCN 240 and supporting regulatory services required for a wireless network, such as EM calls, LI, and WEA.

At stage 1a in FIG. 5, one or more sNBs 112 obtain data containing information for virtual cells or virtual tracking areas or both associated with one or more public land mobile networks (PLMNs). The data, for example, may define one or more of: (i) locations of grid points in an array of grid points; (ii) virtual cell identifiers associated with the grid points; (iii) tracking area identifiers associated with the virtual tracking areas, virtual cell identifiers or the grid points; and (iv) PLMN identifiers associated with the grid points, the virtual cell identifiers or the tracking area identifiers, e.g., as discussed above. The data may be obtained, e.g., from configuration data in the sNBs 112 or from an operations and maintenance (O&M) server. The data may be compressed as discussed above.

At stage 1b, the one or more sNBs 112 may obtain data (e.g. from an O&M server) for satellites 115 that are accessible from the sNBs 112. For example, data may include identifiers for the one or more sNBs 112, locations of ground stations 113 for the one or more sNBs 112, wherein the ground stations 113 are in wireless coverage of the satellites 115, and a list of virtual tracking areas and corresponding PLMNs that are in the wireless coverage of the satellites 115, where the PLMNs are accessible from one or more sNBs 112. If a satellite 115 is not in geosynchronous (also referred to as geostationary) orbit, the one or more sNBs 112 may continue to track movement and change of virtual cell and virtual tracking area coverage of the satellite 115 and update the information for the satellite 115 to correctly align with a new wireless coverage area of the satellites 115.

At stage 2, the one or more sNBs 112 send and the UE 105 receives the broadcast data from one or more space vehicles 115, as obtained by the sNBs 112 at stages 1a and 1b.

At stage 3, the UE 105 performs a positioning procedure, e.g., by obtaining signal measurements of positioning space vehicles 190, terrestrial base stations, satellites 115 or a combination thereof, and obtains a location estimate (also referred to as a location or position) for the UE 105.

At stage 4, the UE 105 determines a virtual cell and/or a virtual TA in which the UE 105 is located using the data received in stage 2 and the position of the UE 105 determined at stage 3. For example, as discussed above, the UE 105 may determine a grid point closest to its location and determine that it is in a virtual cell or a virtual TA associated with that grid point. The UE 105 may need to determine first the country in which the UE 105 is located, e.g., using additional grid points as discussed above. The UE 105 may determine a PLMN associated with the virtual cell and/or virtual TA in which the UE 105 is located. Stages 3 and 4 may be periodically repeated by the UE 105 to determine if the virtual cell in which the UE 105 is located has changed or if the UE 105 has entered or exited a virtual TA, and to determine a PLMN associated with the current virtual cell and/or current virtual TA.

At stage 5, the UE 105 obtains a serving sNB 112 that is accessible from the satellite 115 with which the UE 105 is communicating. For example, the UE 105 may obtain the serving sNB 112 by determining the serving sNB 112 as the sNB with a ground station 113 that is closest to the position of the UE, e.g., using the information received at stage 2.

At stage 6, the UE 105 sends a registration request through space vehicle 115 and serving sNB 112 to the AMF 215 of the serving PLMN that is associated with the serving virtual cell and/or virtual TA in which the UE 105 is located.

At stage 7, the AMF 215 sends a registration accept message to the UE 105 through sNB 112 and space vehicle 115. Stages 5-7 may be repeated to register with a different PLMN, e.g., if the UE 105 moves to a new virtual cell, new virtual TA or new country that is associated with a different PLMN, or to provide monitoring or tracking information for the UE 105 to the PLMN.

At stage 8, the UE 105 may receive and display broadcast WEA messages associated with a current virtual cell for UE 105. For example, the sNB 112 and space vehicle 115 may broadcast a WEA message associated with the virtual cell in which the UE 105 is located. Alternatively, the sNB 112 and space vehicle 115 may broadcast a list of applicable WEA message IDs for each of one or more virtual cell IDs, e.g., in the data of stage 2, and may also provide the WEA messages separately, and the UE 105 may display the appropriate WEA message(s) based on the virtual cell ID of the virtual cell in which it is located.

At stage 9, the UE 105 may make an emergency call to a PSAP associated with a virtual cell in which the UE 105 is located. For example, the UE 105 may include the identifier of the virtual cell in which it is located, i.e., the serving virtual cell, in a SIP INVITE message that is sent to the serving PLMN through the space vehicle 115 and sNB 112. The serving SGCN (e.g. an IMS in the serving SGCN, though illustrated with AMF 215 and LMF 220 in FIG. 5) may then route the EM call to the PSAP associated with the serving virtual cell based on the identifier provided.

At stage 10, the AMF 215 may provide UE related information, including the identifier of a virtual cell in which the UE 105 is located, to law enforcement associated with the virtual cell. If the UE 105 moves into a new virtual cell or new virtual TA and reports the movement to the serving PLMN, the AMF 215 may provide the updated UE information to the enforcement associated with the new virtual cell or new virtual TA.

FIG. 6 shows a flowchart of an example procedure 600 for supporting satellite wireless access by a user equipment (UE) performed by the UE, such as the UE 105 in FIGS. 1, 2, and 5.

As illustrated, at block 602, broadcast data from a first satellite (e.g. an SV 115) is received, the broadcast data containing information for virtual cells or virtual tracking areas or both in wireless coverage of the first satellite and associated with one or more public land mobile networks (PLMNs), wherein virtual cells or virtual tracking areas or both are defined as fixed geographic areas, e.g., as illustrated at stage 2 of FIG. 5 and in FIGS. 3 and 4. At block 604, a position of the UE is obtained, e.g., as illustrated at stage 3 of FIG. 5. At block 606, a serving virtual cell or virtual tracking area in which the UE is located is determined based on the position of the UE and the information for the virtual cells or the virtual tracking areas or both, e.g., as illustrated at stage 4 of FIG. 5. At block 608, a serving satellite Radio Access Network (RAN) node (SRN) (e.g. an sNB 112) accessible from the first satellite is determined, e.g., as illustrated at stage 5 of FIG. 5. At block 610, registration is performed with a serving core network in a serving PLMN associated with the serving virtual cell or tracking area in which the UE is located via the first satellite and the serving SRN, e.g., as illustrated at stage 6 of FIG. 5.

In some implementations, the information for the virtual cells or the virtual tracking areas or both comprises at least one of: (i) locations of grid points in an array of grid points; (ii) virtual cell identifiers associated with the grid points; (iii) tracking area identifiers associated with the virtual tracking areas, the virtual cell identifiers or the grid points; or (iv) PLMN identifiers associated with the grid points, the virtual cell identifiers or the tracking area identifiers, e.g., as discussed in reference to stages 1a and 2 of FIG. 5. The information for the virtual cells and the virtual tracking areas or both may be compressed when inter-grid point spacing and orientation are fixed.

In some implementations, determining the serving virtual cell or virtual tracking area in which the UE is located may include determining a grid point that is closest to the position of the UE, wherein the serving virtual cell or virtual tracking area in which the UE is located is a virtual cell or virtual tracking area associated with a grid point that is closest to the position of the UE, e.g., as discussed in reference to stage 4 of FIG. 5 and for FIGS. 3 and 4. Determining the serving virtual cell or the virtual tracking area in which the UE is located may further include determining a country in which the UE is located; and determining a grid point that is in the country in which the UE is located and that is closest to the position of the UE, wherein the serving virtual cell or the virtual tracking area in which the UE is located is a virtual cell or virtual tracking area associated with a grid point that is closest to the position of the UE and that is in the country in which the UE is located.

In some implementations, the array of grid points may include additional grid points assigned to virtual cells on each side of an international border so that a closest grid point to any location is in a same country as that location, e.g., as illustrated in FIGS. 3 and 4.

In some implementations, the virtual cells or the virtual tracking areas or both extend to cover international areas, wherein the virtual cells or the tracking areas or both in international areas are associated with PLMNs of a proximate country or a home country of the UE, e.g., as illustrated in FIGS. 3 and 4.

In some implementations, obtaining the position of the UE may comprise obtaining signal measurements from one or more of communication satellites, Global Navigation Satellite System (GNSS) satellites (e.g. SVs 190), or terrestrial base stations or a combination thereof, e.g., as discussed in reference to stage 3 of FIG. 5.

In some implementations, the UE may further receives information for the first satellite, the information for the first satellite comprising identifiers for one or more SRNs (e.g. sNBs 112), locations of ground stations for the one or more SRNs, wherein the ground stations are in wireless coverage of the first satellite, and a list of virtual tracking areas and corresponding PLMNs that are in the wireless coverage of the first satellite, wherein the PLMNs are accessible from the one or more SRNs, e.g., as illustrated at stages 1b and 2 of FIG. 5, and may obtain the serving SRN by determining the serving SRN as an SRN from the one or more SRNs with a ground station that is closest to the position of the UE, e.g., as illustrated at stage 5 of FIG. 5. Where the first satellite is not in geostationary orbit, updates may be received for the information for the first satellite to correctly align with a new wireless coverage area of the first satellite.

In some implementations, the UE may provide periodic measurements of visible satellites (e.g. SVs 115) to the serving SRN; receive instructions from the serving SRN for handover from the first satellite to a second satellite (e.g. another SV 115); and perform the handover from the first satellite to the second satellite.

In some implementations, the UE may enter an idle state; and camp on a second satellite (e.g. an SV 115) for which the UE has signal reception and that indicates coverage of the virtual tracking area in which the UE is located. The UE may receive a paging request from an entity in the serving core network via the second satellite.

In some implementations, the UE obtains the position of the UE and determines the virtual tracking area in which the UE is located by selecting the first satellite, wherein the first satellite provides signal reception and access to a preferred PLMN; establishing a signaling connection with an SRN (e.g. an sNB 112) associated with the preferred PLMN and that is accessible from the first satellite, wherein the SRN determines the position of the UE using measurements received from the UE and the first satellite; and receiving the virtual tracking area in which the UE is located from the SRN.

In some implementations, the UE may further initiate an emergency (EM) call to a public safety answering point (PSAP) associated with the serving virtual cell including obtaining an emergency session through the first satellite via a first entity in the serving core network in the serving PLMN; performing an emergency registration with a second entity in the serving PLMN; and sending an emergency call to the second entity in the serving PLMN, wherein the emergency call includes an identifier for the serving virtual cell, wherein the second entity routes the emergency call to the PSAP associated with the identifier for the serving virtual cell, e.g., as illustrated at stage 9 of FIG. 5. The first entity may be an Access and Mobility Management Function (e.g. an AMF 215), and the second entity may be a IP Multimedia Subsystem (IMS) in the serving PLMN.

In some implementations, Lawful Interception (LI) associated with the serving virtual cell is supported by an entity in the serving core network in the serving PLMN by providing information for the UE including a location of the serving virtual cell to a law enforcement agency, e.g., as illustrated at stage 10 of FIG. 5. The information provided for the UE, including the location of the serving virtual cell, to the law enforcement agency may be periodical or triggered based on the UE being in or entering the serving virtual cell.

In some implementations, the UE may further support Wireless Emergency Alerting (WEA) associated with the serving virtual cell comprising receiving from the first satellite and displaying to a user of the UE a WEA message associated with the serving virtual cell, e.g., as illustrated at stage 8 of FIG. 5. In some implementations, the UE may receive a broadcast from the first satellite for each of one more virtual cells within a wireless coverage area of the first satellite, wherein the broadcast associated with the serving virtual cell contains one or more WEA messages assigned to the serving virtual cell. In some implementations, the UE may receive a broadcast from the first satellite that contains all WEA messages for virtual cells within a wireless coverage area of the first satellite, each WEA message including one or more virtual cell identifiers for which it is applicable. In some implementations, the UE may receive a first broadcast from the first satellite that contains all WEA messages for virtual cells within a wireless coverage area of the first satellite, each WEA message including an associated reference identifier; and receive a second broadcast from the first satellite that contains one or more reference identifiers associated with the serving virtual cell.

FIG. 7 shows a flowchart of an example procedure 700 for supporting satellite wireless access by a user equipment (e.g. a UE 105) performed by a satellite Radio Access Network (RAN) node, such as the sNB 112 in FIGS. 1, 2, and 5.

As illustrated, at block 702, first broadcast data is obtained, the first broadcast data containing information for virtual cells or virtual tracking areas or both and associated with one or more public land mobile networks (PLMNs), wherein virtual cells or virtual tracking areas or both are defined as fixed geographic areas, e.g., as illustrated at stage 1a of FIG. 5 and in FIGS. 3 and 4. At block 704, second broadcast data is obtained, the second broadcast data containing information for a first satellite (e.g. an SV 115), wherein the first satellite is accessible from at least one ground station for the satellite RAN node and from the UE, e.g., as illustrated at stage 1b of FIG. 5. At block 706, the first broadcast data and the second broadcast data are transmitted to the UE periodically via the first satellite, e.g., as illustrated at stage 2 of FIG. 5. At block 708, a registration request is received from the UE to a serving core network (e.g. a 5GCN 240) in a serving PLMN associated with a serving virtual cell or a virtual tracking area in which the UE is located via the first satellite, e.g., as illustrated at stage 6 of FIG. 5. At block 710, the registration request is provided to a first entity in the serving core network, e.g., as illustrated at stage 6 of FIG. 5.

In some implementations, the first broadcast data and the second broadcast data are obtained from configuration data or from operation and management (e.g. O&M).

In some implementations, the information for the virtual cells or the virtual tracking areas or both comprises at least one of: (i) locations of grid points in an array of grid points; (ii) virtual cell identifiers associated with the grid points; (iii) tracking area identifiers associated with the virtual tracking areas, the virtual cell identifiers or the grid points; or (iv) PLMN identifiers associated with the grid points, the virtual cell identifiers or the tracking area identifiers, e.g., as discussed in reference to stages 1a and 2 of FIG. 5. The information for the virtual cells or the virtual tracking areas or both may be compressed when inter-grid point spacing and orientation are fixed.

In some implementations, the array of grid points may include additional grid points assigned to virtual cells on each side of an international border so that a closest grid point to any location is in a same country as that location, e.g., as illustrated in FIGS. 3 and 4.

In some implementations, the virtual cells or the virtual tracking areas or both may extend to cover international areas, wherein the virtual cells or the virtual tracking areas or both in international areas are associated with PLMNs of a proximate country or a home country of the UE, e.g., as illustrated in FIGS. 3 and 4.

In some implementations, the information for the first satellite comprises an identifier for the satellite RAN node, locations of ground stations for the satellite RAN node, wherein the ground stations are in wireless coverage of the first satellite, and a list of virtual tracking areas and corresponding PLMNs that are in the wireless coverage of the first satellite, wherein the PLMNs are accessible from the satellite RAN node, e.g., as illustrated at stages 1b and 2 of FIG. 5. Additionally, each virtual tracking area in the list of virtual tracking areas may be wholly or mostly included in a current coverage area of the first satellite.

In some implementations, where the first satellite is not in geostationary orbit, the satellite Radio Access Network (RAN) node may further track movement and change of virtual cell or virtual tracking area coverage or both of the first satellite and update the information for the first satellite to correctly align with a new wireless coverage area of the first satellite, e.g., as illustrated at stage 1b of FIG. 5.

In some implementations, periodic measurements of visible satellites (e.g. SVs 115) from the UE may be received via the first satellite in wireless communication with the UE. A second satellite (e.g. another SV 115) for the wireless communication with the UE may be determined based on one or more of improved signal reception at the UE, coverage for a current location of the UE at current and later times based on satellite orbital data for the second satellite if the second satellite is in non-geostationary orbit, an ability to access the second satellite from a ground station associated with the satellite RAN node, or a combination thereof. The satellite RAN node may then provide to the UE, via the first satellite, handover instructions for UE handover from the first satellite to the second satellite.

In some implementations, a paging request and a virtual tracking area identifier or a virtual cell identifier for the UE, in which the UE is last known to be located when the UE is in an idle state, may be received from a second entity in the serving core network. The paging request to the UE may be broadcast via all satellites with wireless coverage of the virtual tracking area or virtual cell identifier.

In some implementations, signal measurements for one or more satellites may be received from the UE. A position of the UE may be estimated using the signal measurements. A virtual tracking area of the UE may be determined based on the position of the UE. An identifier for the virtual tracking area may be provided to the UE.

In some implementations, an emergency (EM) call from the UE may be facilitated through the first satellite to a public safety answering point (PSAP) associated with the serving virtual cell or the virtual tracking area in which the UE is located, e.g., as illustrated stage 9 of FIG. 5.

In some implementations, Wireless Emergency Alerting (WEA) associated with the serving virtual cell may be supported, including broadcasting via the first satellite a WEA message associated with the serving virtual cell, e.g., as illustrated stage 8 of FIG. 5. In one implementation, a broadcast may be sent from the first satellite for each of one or more virtual cells within a wireless coverage area of the first satellite, wherein the broadcast associated with the serving virtual cell contains one or more WEA messages assigned to the serving virtual cell. In one implementation, a broadcast may be sent from the first satellite that contains all WEA messages for virtual cells within a wireless coverage area of the first satellite, each WEA message including one or more virtual cell identifiers for which it is applicable. In one implementation, a first broadcast may be sent from the first satellite that contains all WEA messages for virtual cells within a wireless coverage area of the first satellite, each WEA message including an associated reference identifier; and a second broadcast may be sent from the first satellite that contains one or more reference identifiers associated with the serving virtual cell.

FIG. 8 shows a flowchart of an example procedure 800 for supporting satellite wireless access by a user equipment (e.g. a UE 105) performed by a satellite, e.g., SV 115 shown in FIGS. 1, 2, and 5, that is in wireless communication with a satellite Radio Access Network (RAN) node (SRN), such as sNB 112.

As illustrated, at block 802, first broadcast data is received from the SRN, the first broadcast data containing information for virtual cells or virtual tracking areas or both associated with one or more public land mobile networks (PLMNs), wherein virtual cells or virtual tracking areas or both are defined as fixed geographic areas, e.g., as illustrated at stage 2 of FIG. 5. At block 804, second broadcast data is received from the SRN, the second broadcast data containing information for the satellite, e.g., as illustrated at stage 2 of FIG. 5. At block 806, the first broadcast data and the second broadcast data are transmitted periodically to the UE, e.g., as illustrated at stage 2 of FIG. 5. At block 808, a registration request is received from the UE to a serving core network (e.g. a SGCN 240) in a serving PLMN associated with a serving virtual cell or a virtual tracking area in which the UE is located, e.g., as illustrated at stage 6, of FIG. 5. At block 810, the registration request is provided to the SRN to be sent to the serving core network, e.g., as illustrated at stage 6, of FIG. 5.

In some implementations, the information for the virtual cells or the virtual tracking areas or both comprises at least one of: (i) locations of grid points in an array of grid points; (ii) virtual cell identifiers associated with the grid points; (iii) tracking area identifiers associated with the virtual tracking areas, the virtual cell identifiers or the grid points; and (iv) PLMN identifiers associated with the grid points, the virtual cell identifiers or the tracking area identifiers, e.g., as discussed in reference to stages 1a and 2 of FIG. 5. The information for the virtual cells or the virtual tracking areas or both may be compressed when inter-grid point spacing and orientation are fixed.

In some implementations, the array of grid points may include additional grid points assigned to virtual cells on each side of an international border so that a closest grid point to any location is in a same country as that location, e.g., as illustrated in FIGS. 3 and 4.

In some implementations, the virtual cells or the virtual tracking areas or both extend to cover international areas, wherein the virtual cells or the virtual tracking areas or both in international areas are associated with PLMNs of a proximate country or a home country of the UE, e.g., as illustrated in FIGS. 3 and 4.

In some implementations, the information for the satellite comprises identifiers for one or more SRNs (e.g. sNBs 112), locations of ground stations for the one or more SRNs, wherein the ground stations are in wireless coverage of the satellite, and a list of virtual tracking areas and corresponding PLMNs that are in wireless coverage of the satellite, wherein the PLMNs are accessible from the one or more SRNs, e.g., as illustrated at stages 1b and 2 of FIG. 5. Each virtual tracking area in the list of virtual tracking areas may be wholly or mostly included in a current wireless coverage area of the satellite. In some implementations, where the satellite is not in geo stationary orbit, the satellite updates the information for the satellite to correctly align with a new wireless coverage area of the satellite.

In some implementations, periodic measurements of visible satellites (e.g. SVs 115) from the UE may be provided to the SRN. Instructions from the SRN may be provided to the UE for handover from the satellite to a second satellite (e.g. another SV 115). The handover from the satellite to the second satellite may be performed.

In some implementations, a paging request is received for the UE when the UE is in an idle state from the SRN and has a last known location that is in a virtual tracking area or a virtual cell that is in a wireless coverage of the satellite, and the paging request is broadcast to the UE.

In some implementations, signal measurements of one or more satellites (e.g. SVs 115) are provided to the SRN from the UE, and a virtual tracking area is provided to the UE determined by the SRN based on a position of the UE determined using the signaling measurements.

In some implementations, an emergency (EM) call from the UE is facilitated through the SRN to a public safety answering point (PSAP) associated with the serving virtual cell or the virtual tracking area in which the UE is located, e.g., as illustrated at stage 9 of FIG. 5.

In some implementations, the satellite supports Wireless Emergency Alerting (WEA) associated with the serving virtual cell comprising broadcasting a WEA message associated with the serving virtual cell, e.g., as illustrated at stage 8 of FIG. 5. In one implementation, the satellite sends a broadcast for each of one or more virtual cells within a wireless coverage area of the satellite, wherein the broadcast associated with the serving virtual cell contains one or more WEA messages assigned to the serving virtual cell. In one implementation, the satellite sends a broadcast that contains all WEA messages for virtual cells within a wireless coverage area of the satellite, each WEA message including one or more virtual cell identifiers for which it is applicable. In one implementation, the satellite sends a first broadcast that contains all WEA messages for virtual cells within a wireless coverage area of the satellite, each WEA message including an associated reference identifier; and sends a second broadcast that contains one or more reference identifiers associated with the serving virtual cell.

Figure 9:
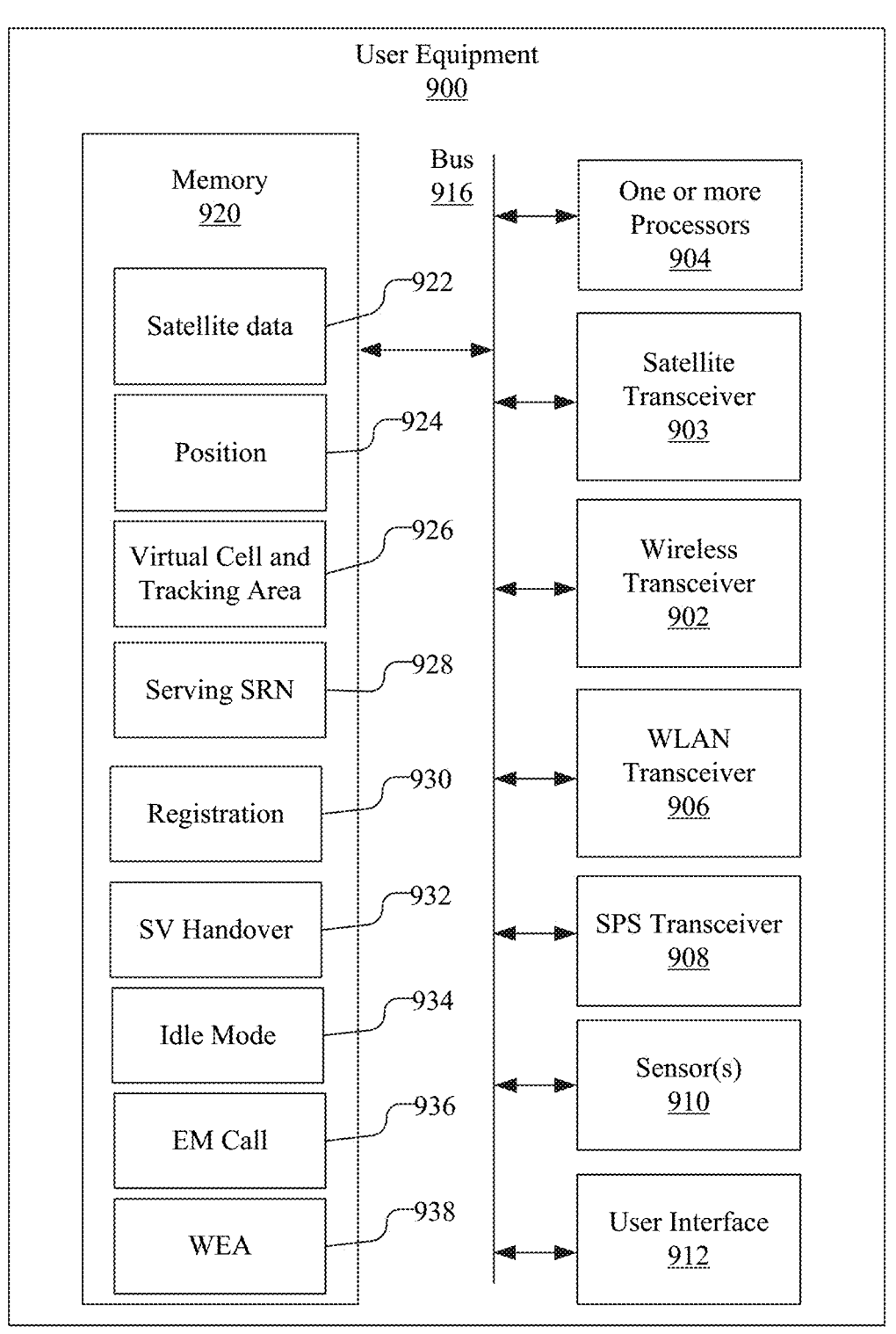
FIG. 9 is a block diagram of an embodiment of a UE capable of supporting satellite access in 5G NR.

FIG. 9 is a diagram illustrating an example of a hardware implementation of UE 900, such as UE 105 shown in FIGS. 1, 2, and 5. The UE 900 may perform the process flow 600 of FIG. 6. The UE 900 may include, e.g., hardware components such as a satellite transceiver 903 to wirelessly communicate with a satellite 115 and an associated sNB 112 in an NG-RAN 110, e.g., as shown in FIGS. 1 and 2. The UE 900 may further include wireless transceiver 902 to wirelessly communicate with terrestrial base stations in an NG-RAN 110, e.g., base stations such as gNB 210 or ng-eNB (shown in FIG. 2). The UE 900 may also include additional transceivers, such a wireless local area network (WLAN) transceiver 906, as well as an SPS receiver 908 for receiving and measuring signals from SPS SVs 190 (shown in FIG. 1). The UE 900 may further include one or more sensors 910, such as cameras, accelerometers, gyroscopes, electronic compass, magnetometer, barometer, etc. The UE 900 may further include a user interface 912 that may include e.g., a display, a keypad or other input device, such as virtual keypad on the display, through which a user may interface with the UE 900. The UE 900 further includes one or more processors 904 and memory 920, which may be coupled together with bus 916. The one or more processors 904 and other components of the UE 900 may similarly be coupled together with bus 916, a separate bus, or may be directly connected together or coupled using a combination of the foregoing. The memory 920 may contain executable code or software instructions that when executed by the one or more processors 904 cause the one or more processors to operate as a special purpose computer programmed to perform the methods and procedures disclosed herein (e.g. such as the process flow 600 shown in FIG. 6).

As illustrated in FIG. 9, the memory 920 may include one or more components or modules that may be implemented by the one or more processors 904 to perform the methodologies described herein. While the components or modules are illustrated as software in memory 920 that is executable by the one or more processors 904, it should be understood that the components or modules may be firmware or dedicated hardware either in the one or more processors 904 or off the processors.

As illustrated, the memory 920 may include satellite data module 922 that that when implemented by the one or more processors 904 configures the one or more processors 904 to receive broadcast data from a first satellite, the broadcast data containing information for virtual cells and virtual tracking areas in wireless coverage of the first satellite and associated with one or more public land mobile networks (PLMNs), wherein virtual cells and virtual tracking areas are defined as fixed geographic areas, e.g., as discussed at stage 2 of FIG. 5. The satellite data module 922 may further configure the one or more processors 904 to receive satellite Radio Access Network (RAN) node (SRN) identifiers for one or more SRNs accessible from the first satellite, locations of ground stations for the one or more SRNs that are accessible from the first satellite, and a list of virtual tracking areas and corresponding PLMNs that are in coverage of the first satellite. The satellite data module 922 may further configure the one or more processors 904 to receive updates for information from satellite that are not in geosynchronous orbit. The satellite data module 922 may further configure the one or more processors 904 to received broadcasts of WEA messages.

The memory 920 may include a position module 924 that when implemented by the one or more processors 904 configures the one or more processors 904 to obtain a position of the UE, e.g., using signal measurements from one or more of communication satellites, e.g., received by satellite transceiver 903, Global Navigation Satellite System (GNSS) satellites received by SPS transceiver 908, or terrestrial base stations received by wireless transceiver 902 or a combination thereof. The position module 924 may configure the one or more processors 904 to select a satellite with signal reception and access to a preferred PLMN, establishing a signaling connection with an SRN associated with the preferred PLMN and that is accessible from the satellite, wherein the SRN determines the position of the UE using measurements received from the UE and the first satellite; and receive the virtual tracking area in which the UE is located from the SRN.

The memory 920 may include a virtual cell and tracking area module 926 that when implemented by the one or more processors 904 configures the one or more processors 904 to determine a serving virtual cell or virtual tracking area in which the UE is located based on the position of the UE and the information for the virtual cells and the virtual tracking areas, e.g., as discussed at stage 4 of FIG. 5. The one or more processors 904 may be configured to determine grid points that are closest to the position of the UE, wherein the serving virtual cell or virtual tracking area in which the UE is located is a virtual cell or virtual tracking area associated with the grid point that is closest to the position of the UE or to determine a country in which the UE is located and determine the grid point that is in the country in which the UE is located and that is closest to the position of the UE to determine the associated serving virtual cell or virtual tracking area.

The memory 920 may include a serving SRN module 928 that when implemented by the one or more processors 904 configures the one or more processors 904 to determine a serving satellite Radio Access Network (RAN) node (SRN) accessible from a satellite, e.g., as discussed at stage 5 of FIG. 5. The one or more processors 904 may be further configured to select a satellite with signal reception and access to a preferred PLMN, and to establish a signaling connection with an SRN associated with the preferred PLMN; and a receive the virtual tracking area in which the UE is located from the SRN.

The memory 920 may include a registration module 930 that when implemented by the one or more processors 904 configures the one or more processors 904 to perform a registration with a serving core network in a serving PLMN associated with the serving virtual cell or virtual tracking area in which the UE is located via the first satellite and the serving SRN, e.g., as discussed at stage 6 of FIG. 5.

The memory 920 may include an SV handover module 932 that when implemented by the one or more processors 904 configures the one or more processors 904 to perform a handover from one satellite to another. For example, the SV handover module 932 may configured the one or more processors 904 to provide periodic measurements of visible satellites to the serving SRN, and in response to receive instructions from the serving SRN for handover from one satellite to another, and in response to perform the handover from one satellite to another.

The memory 920 may include an idle mode module 934 that when implemented by the one or more processors 904 configures the one or more processors 904 to enter an idle mode and to camp on a satellite for which the UE has signal reception and that indicates coverage of the virtual tracking area in which the UE is located. Additionally, the one or more processors 904 may be configured to receive a paging request from an entity in the serving core network via the satellite.

The memory 920 may include an EM call module 936 that when implemented by the one or more processors 904 configures the one or more processors 904 to initiate an emergency call to a public safety answering point (PSAP) associated with the serving virtual cell, e.g., including obtaining an emergency session through a satellite via a first entity in the serving core network in the serving PLMN, perform an emergency registration with a second entity in the serving PLMN, and send an emergency call to the second entity in the serving PLMN, wherein the emergency call includes an identifier for the serving virtual cell, wherein the second entity routes the emergency call to the PSAP associated with the identifier for the serving virtual cell.

The memory 920 may include a WEA module 938 that when implemented by the one or more processors 904 configures the one or more processors 904 to support Wireless Emergency Alerting (WEA) associated with the serving virtual cell including receiving from the first satellite and displaying to a user of the UE a WEA message associated with the serving virtual cell. For example, the one or more processors 904 may be configured to receive broadcast from the first satellite for each virtual cell in each virtual tracking area within a coverage area of the first satellite, wherein the broadcast associated with the serving virtual cell contains one or more WEA messages assigned to the serving virtual cell. In another example, the one or more processors 904 may be configured to receive a broadcast from the first satellite that contains all WEA messages for virtual tracking areas within a coverage area of the first satellite, each WEA message including a virtual cell identifier for which it is applicable. In another example, the one or more processors 904 may be configured to receive a first broadcast from the first satellite that contains all WEA messages for virtual tracking areas within a coverage area of the first satellite, each WEA message including an associated reference identifier; and receive a second broadcast from the first satellite that contains the reference identifier associated with the serving virtual cell.

The methodologies described herein may be implemented by various means depending upon the application. For example, these methodologies may be implemented in hardware, firmware, software, or any combination thereof. For a hardware implementation, the one or more processors 904 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 900 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 920) and executed by one or more processors 904, causing the one or more processors 904 to operate as a special purpose computer programmed to perform the techniques disclosed herein. Memory may be implemented within the one or processors 904 or external to the one or more processors 904. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 900 may be stored as one or more instructions or code on a non-transitory computer-readable storage medium such as memory 920. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 900 may be provided as signals on transmission media included in a communication apparatus. For example, a communication apparatus comprising part or all of UE 900 may include a transceiver having signals indicative of instructions and data. The instructions and data are stored on non-transitory computer readable media, e.g., memory 920, and are configured to cause the one or more processors 904 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a user equipment (UE) that support satellite wireless may include a means for receiving a broadcast data from a first satellite, the broadcast data containing information for virtual cells or virtual tracking areas or both in wireless coverage of the first satellite and associated with one or more public land mobile networks (PLMNs), wherein virtual cells or virtual tracking areas or both are defined as fixed geographic areas, which may be, e.g., the satellite transceiver 903 and one or more processors 904 with dedicated hardware or implementing executable code or software instructions in memory 920, such as the satellite data module 922. A means for obtaining a position of the UE may be, e.g., one or more of the SPS transceiver 908, wireless transceiver 902, WLAN transceiver 906, or sensors 910 and one or more processors 904 with dedicated hardware or implementing executable code or software instructions in memory 920, such as the position module 924. A means for obtaining a serving virtual cell or virtual tracking area in which the UE is located based on the position of the UE and the information for the virtual cells or the virtual tracking areas or both may be, e.g., the one or more processors 904 with dedicated hardware or implementing executable code or software instructions in memory 920, such as the virtual cell and tracking area module 926. A means for determining a serving satellite Radio Access Network (RAN) node (SRN) accessible from the first satellite may be, e.g., the one or more processors 904 with dedicated hardware or implementing executable code or software instructions in memory 920, such as the serving SRN module 928. A means for performing a registration with a serving core network in a serving PLMN associated with the serving virtual cell or virtual tracking area in which the UE is located via the first satellite and the serving SRN may be, e.g., satellite transceiver 903 and the one or more processors 904 with dedicated hardware or implementing executable code or software instructions in memory 920, such as the registration module 930.

In some implementations, the information for the virtual cells or the virtual tracking areas or both comprises at least one of locations of grid points in an array of grid points; virtual cell identifiers associated with the grid points; tracking area identifiers associated with the virtual tracking areas, the virtual cell identifiers, or the grid points, and PLMN identifiers associated with the grid points, the cell identifiers or the virtual tracking area identifiers and the means for determining the serving virtual cell or virtual tracking area in which the UE is located may include a means for determining a grid point that is closest to the position of the UE, wherein the serving virtual cell or virtual tracking area in which the UE is located is a virtual cell or virtual tracking area associated with a grid point that is closest to the position of the UE, which may be the one or more processors 904 with dedicated hardware or implementing executable code or software instructions in memory 920, such as the virtual cell and tracking area module 926. For example, the means for determining the serving virtual cell or the virtual tracking area in which the UE is located may include a means for determining a country in which the UE is located which may be, e.g., the one or more processors 904 with dedicated hardware or implementing executable code or software instructions in memory 920, such as the virtual cell and tracking area module 926, and a means for determining a grid point that is in the country in which the UE is located and that is closest to the position of the UE, wherein the serving virtual cell or the virtual tracking area in which the UE is located is a virtual cell or virtual tracking area associated with a grid point that is closest to the position of the UE and that is in the country in which the UE is located, which may be, e.g., the one or more processors 904 with dedicated hardware or implementing executable code or software instructions in memory 920, such as the virtual cell and tracking area module 926.

In some implementations, the means for obtaining the position of the UE comprises means for obtaining signal measurements from one or more of communication satellites, Global Navigation Satellite System (GNSS) satellites, or terrestrial base stations or a combination thereof, which may be, e.g., one or more of the SPS transceiver 908, wireless transceiver 902, WLAN transceiver 906, or sensors 910 and one or more processors 904 with dedicated hardware or implementing executable code or software instructions in memory 920, such as the position module 924

In some implementations, the UE may further include a means for receiving information for the first satellite, the information for the first satellite comprising identifiers for one or more SRNs, locations of ground stations for the one or more SRNs, wherein the ground stations are in wireless coverage of the first satellite, and a list of virtual tracking areas and corresponding PLMNs that are in the wireless coverage of the first satellite, wherein the PLMNs are accessible from the one or more SRNs, which may be, e.g., the satellite transceiver 903 and one or more processors 904 with dedicated hardware or implementing executable code or software instructions in memory 920, such as the satellite data module 922. The UE may further include a means for obtaining the serving SRN by determining the serving SRN as an SRN from the one or more SRNs with a ground station that is closest to the position of the UE, which may be, e.g., the one or more processors 904 with dedicated hardware or implementing executable code or software instructions in memory 920, such as the serving SRN module 928. For example, the first satellite may not be in geostationary orbit, and the UE may include a means for receiving updates for the information for the first satellite to correctly align with a new wireless coverage area of the first satellite, which may be, e.g., the satellite transceiver 903 and one or more processors 904 with dedicated hardware or implementing executable code or software instructions in memory 920, such as the satellite data module 922. The UE may include a means for providing periodic measurements of visible satellites to the serving SRN, means for receiving instructions from the serving SRN for handover from the first satellite to a second satellite; and means for performing the handover from the first satellite to the second satellite, which may be, e.g., the satellite transceiver 903 and one or more processors 904 with dedicated hardware or implementing executable code or software instructions in memory 920, such as the SV handover module 932.

The UE may include a means for entering an idle state; and camping on a second satellite for which the UE has signal reception and that indicates coverage of the virtual tracking area in which the UE is located which may be, e.g., the satellite transceiver 903 and one or more processors 904 with dedicated hardware or implementing executable code or software instructions in memory 920, such as the idle mode module 934. The UE may further include a means for receiving a paging request from an entity in the serving core network via the second satellite, which may be, e.g., the satellite transceiver 903 and one or more processors 904 with dedicated hardware or implementing executable code or software instructions in memory 920, such as the idle mode module 934.

In some implementations, the means for obtaining the position of the UE and means for determining the virtual tracking area in which the UE is located may include a means for selecting the first satellite, wherein the first satellite provides signal reception and access to a preferred PLMN; a means for establishing a signaling connection with an SRN associated with the preferred PLMN and that is accessible from the first satellite, wherein the SRN determines the position of the UE using measurements received from the UE and the first satellite; and a means for receiving the virtual tracking area in which the UE is located from the SRN, which may be, e.g., the SPS transceiver 908 and one or more processors 904 with dedicated hardware or implementing executable code or software instructions in memory 920, such as the SRN module 928.

The UE may include a means for initiating an emergency (EM) call to a public safety answering point (PSAP) associated with the serving virtual cell that include a means for obtaining an emergency session through the first satellite via a first entity in the serving core network in the serving PLMN; a means for performing an emergency registration with a second entity in the serving PLMN; and a means for sending an emergency call to the second entity in the serving PLMN, wherein the emergency call includes an identifier for the serving virtual cell, wherein the second entity routes the emergency call to the PSAP associated with the identifier for the serving virtual cell, which may be, e.g., the SPS transceiver 908 and one or more processors 904 with dedicated hardware or implementing executable code or software instructions in memory 920, such as the EM call module 936.

The UE may include a means for supporting Wireless Emergency Alerting (WEA) associated with the serving virtual cell that include a means for receiving from the first satellite and displaying to a user of the UE a WEA message associated with the serving virtual cell, which may be, e.g., the SPS transceiver 908 and one or more processors 904 with dedicated hardware or implementing executable code or software instructions in memory 920, such as the WEA module 938. For example, the UE may include a means for receiving a broadcast from the first satellite for each of one or more virtual cells within a wireless coverage area of the first satellite, wherein the broadcast associated with the serving virtual cell contains one or more WEA messages assigned to the serving virtual cell, which may be, e.g., the SPS transceiver 908 and one or more processors 904 with dedicated hardware or implementing executable code or software instructions in memory 920, such as the satellite data module 922 and the WEA module 938. The UE may include a means for receiving a broadcast from the first satellite that contains all WEA messages for virtual cells within a wireless coverage area of the first satellite, each WEA message including one or more virtual cell identifiers for which it is applicable, which may be, e.g., the SPS transceiver 908 and one or more processors 904 with dedicated hardware or implementing executable code or software instructions in memory 920, such as the satellite data module 922 and the WEA module 938. The UE may include a means for receiving a first broadcast from the first satellite that contains all WEA messages for virtual cells within a wireless coverage area of the first satellite, each WEA message including an associated reference identifier; and means for receiving a second broadcast from the first satellite that contains one or more reference identifiers associated with the serving virtual cell, which may be, e.g., the SPS transceiver 908 and one or more processors 904 with dedicated hardware or implementing executable code or software instructions in memory 920, such as the satellite data module 922 and the WEA module 938.

Figure 10:
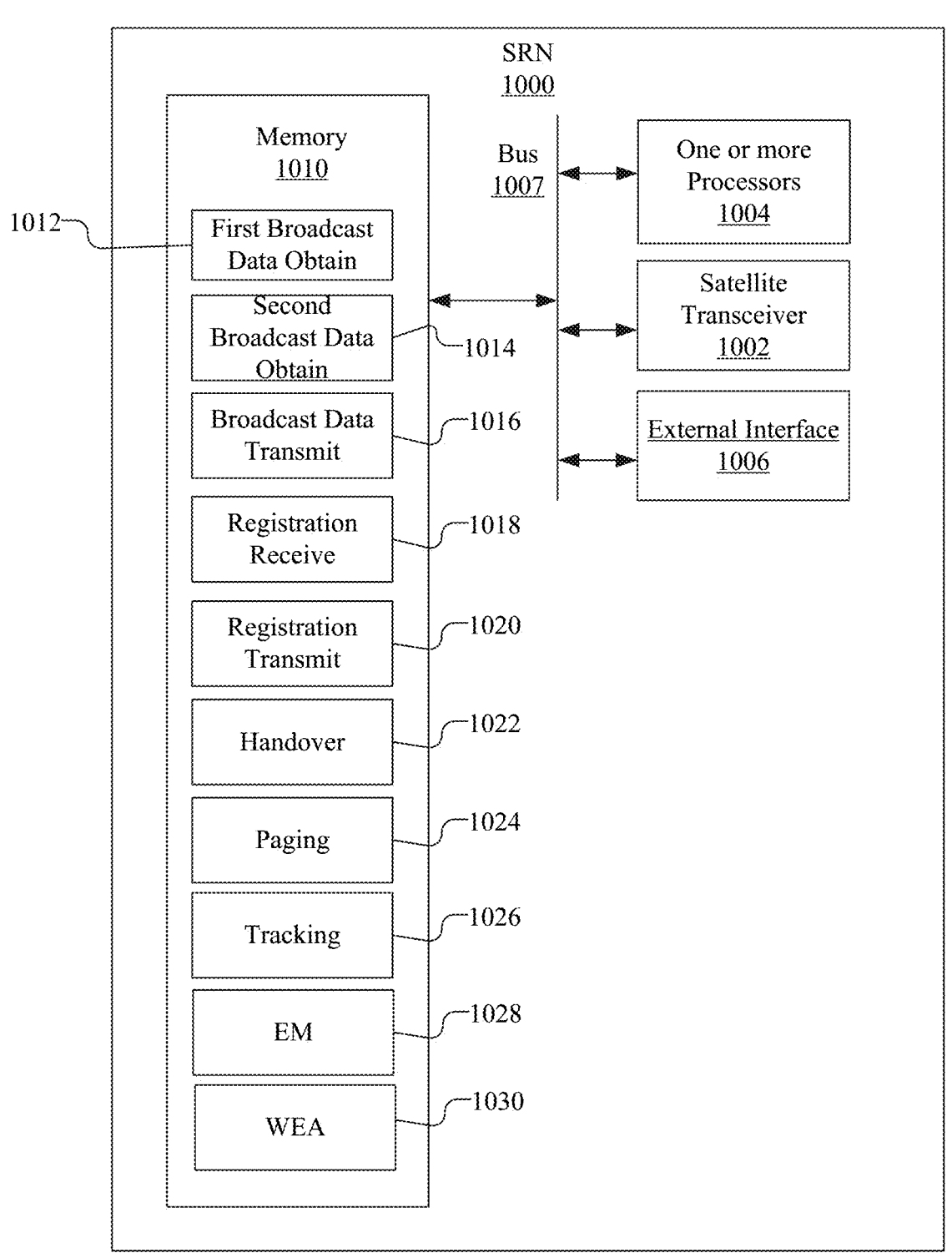
FIG. 10 is a block diagram of an embodiment of a satellite Radio Access Network (RAN) node (SRN) capable of supporting satellite access in 5G NR.

FIG. 10 is a diagram illustrating an example of a hardware implementation of a satellite Radio Access Network (RAN) node (SRN) 1000, such as the sNB 112 illustrated in FIGS. 1, 2, and 5. The SRN 1000 may perform the process flow 700 of FIG. 7. The SRN 1000 includes, e.g., hardware components such as a satellite transceiver 1002, e.g., ground station 113, capable of communicating with one or more satellites 115 and one or more UEs 105. The SRN 1000 may further include an external interface 1006, which may comprise one or more wired and/or wireless interfaces capable of connecting to and communicating one or more entities in a core network in a PLMN, such as AMF 215 or UPF 228 in SGCN 240 shown in FIG. 2, as well as other sNBs, and to other elements in a wireless network directly or through one or more intermediary networks and/or one or more network entities, as shown in FIGS. 1 and 2. The external interface 1006 may include one or more antennas (not shown in FIG. 10) to support a wireless interface and/or a wireless backhaul to elements in the wireless network. The SRN 1000 includes one or more processors 1004 and memory 1010, which may be coupled together with a bus 1007. The memory 1010 may contain executable code or software instructions that when executed by the one or more processorssors 1004 cause the one or more processors 1004 to operate as a special purpose computer programmed to perform the techniques disclosed herein (e.g. such as the process flow 700 shown in FIG. 7).

As illustrated in FIG. 10, the memory 1010 may include one or more components or modules that may be implemented by the one or more processors 1004 to perform the methodologies as described herein. While the components or modules are illustrated as software in memory 1010 that is executable by the one or more processors 1004, it should be understood that the components or modules may be firmware or dedicated hardware either in the one or more processors 1004 or off the processors.

As illustrated, the memory 1010 may include a first broadcast data obtain module 1012 that when implemented by the one or more processors 1004 configures the one or more processors 1004 to obtain broadcast data containing information for virtual cells and virtual tracking areas associated with one or more public land mobile networks (PLMNs), wherein virtual cells and virtual tracking areas are defined as fixed geographic areas, e.g., as illustrated in stage 1 of FIG. 5. For example, the first broadcast data may be obtained from configuration data or from operation and management.

The memory 1010 may include a second broadcast data obtain module 1014 that when implemented by the one or more processors 1004 configures the one or more processors 1004 to obtain broadcast data information for a first satellite, wherein the first satellite is accessible from the satellite RAN node and from the UE, e.g., as illustrated in stage 1 of FIG. 5. For example, the first broadcast data may be obtained from configuration data or from operation and management.

The memory 1010 may include a broadcast data transmit module 1016 that when implemented by the one or more processors 1004 configures the one or more processors 1004 to transmit via the satellite transceiver 1002 the first broadcast data and the second broadcast data to the UE periodically via the first satellite, e.g., as illustrated in stage 2 of FIG. 5.

The memory 1010 may include a registration receive module 1018 that when implemented by the one or more processors 1004 configures the one or more processors 1004 to receive via the satellite transceiver 1002 a registration request from the UE to a serving core network in a serving PLMN associated with a serving virtual cell or a virtual tracking area in which the UE is located via the first satellite, e.g., as illustrated in stage 6 of FIG. 5.

The memory 1010 may include a registration transmit module 1020 that when implemented by the one or more processors 1004 configures the one or more processors 1004 to transmit via the external interface 1006 the registration request to a first entity in the serving core network, e.g., as illustrated in stage 6 of FIG. 5.

The memory 1010 may include a handover module 1022 that when implemented by the one or more processors 1004 configures the one or more processors 1004 to receive periodic measurements of visible satellites from the UE and determine a different satellite for the wireless communication with the UE based on one or more of improved signal reception at the UE, coverage for a current location of the UE at current and later times based on satellite orbital data for the second satellite if the second satellite is in non-geosynchronous orbit, an ability to access the second satellite from a ground station associated with the satellite RAN node, or a combination thereof. The one or more processors 1004 may be configured to provide the UE with handover instructions from one satellite to a different satellite.

The memory 1010 may include a paging module 1024 that when implemented by the one or more processors 1004 configures the one or more processors 1004 to receive a paging request and a virtual tracking area for the UE in which the UE is last known to be located when the UE is in an idle state from an entity in the serving core network, such as the AMF or LMF and to broadcast the paging request to the UE via all satellites with wireless coverage of the virtual tracking area, via the satellite transceiver 1002.

The memory 1010 may include a tracking module 1026 that when implemented by the one or more processors 1004 configures the one or more processors 1004 to receive from the UE signal measurements for one or more satellites, estimate a position of the UE using the signal measurements; and determine a virtual tracking area of the UE based on the position of the UE; and to provide the virtual tracking area to the UE, e.g. via the satellite transceiver 1002.

The memory 1010 may include an EM module 1028 that when implemented by the one or more processors 1004 configures the one or more processors 1004 to facilitate an emergency (EM) call from the UE through the first satellite to a public safety answering point (PSAP) associated with the serving virtual cell or the virtual tracking area in which the UE is located, e.g., via the satellite transceiver 1002 and the external interface 1006.

The memory 1010 may include an WEA module 1030 that when implemented by the one or more processors 1004 configures the one or more processors 1004 to support Wireless Emergency Alerting (WEA) associated with the serving virtual cell, including broadcasting via the first satellite a WEA message associated with the serving virtual cell, e.g., the satellite transceiver 1002. For example, the one or more processors 1004 may be configured to send, via the satellite transceiver 1002, a broadcast from the first satellite for each virtual cell in each virtual tracking area within a wireless coverage area of the first satellite, wherein the broadcast associated with the serving virtual cell contains one or more WEA messages assigned to the serving virtual cell. The one or more processors 1004 may be configured to send, via the satellite transceiver 1002, a broadcast from the first satellite that contains all WEA messages for virtual tracking areas within a wireless coverage area of the first satellite, each WEA message including a virtual cell identifier for which it is applicable. The one or more processors 1004 may be configured to send, via the satellite transceiver 1002, a first broadcast from the first satellite that contains all WEA messages for virtual tracking areas within a wireless coverage area of the first satellite, each WEA message including an associated reference identifier; and to send a second broadcast from the first satellite that contains a reference identifier associated with the serving virtual cell.

The methodologies described herein may be implemented by various means depending upon the application. For example, these methodologies may be implemented in hardware, firmware, software, or any combination thereof. For a hardware implementation, the one or more processors 1004 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of SRN 1000 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1010) and executed by one or more processors 1004, causing the one or more processors 1004 to operate as a special purpose computer programmed to perform the techniques disclosed herein. Memory may be implemented within the one or processors 1004 or external to the one or more processors 1004. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by SRN 1000 may be stored as one or more instructions or code on a non-transitory computer-readable storage medium such as memory 1010. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for SRN 1000 may be provided as signals on transmission media included in a communication apparatus. For example, a communication apparatus comprising part or all of SRN 1000 may include a transceiver having signals indicative of instructions and data. The instructions and data are stored on non-transitory computer readable media, e.g., memory 1010, and are configured to cause the one or more processors 1004 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, the satellite Radio Access Network (RAN) node may include, e.g., means for obtaining first broadcast data, the first broadcast data containing information for virtual cells or virtual tracking areas or both associated with one or more public land mobile networks (PLMNs), wherein virtual cells or virtual tracking areas or both are defined as fixed geographic areas, which may be, e.g., which may be, e.g., the one or more processors 1004 with dedicated hardware or implementing executable code or software instructions in memory 1010, such as the first broadcast data obtain module 1012 using configuration data or operation and management. A means for obtaining second broadcast data, the second broadcast data containing information for a first satellite, wherein the first satellite is accessible from the satellite RAN node and from the UE may be, e.g., the one or more processors 1004 with dedicated hardware or implementing executable code or software instructions in memory 1010, such as the second broadcast data obtain module 1014 using configuration data or operation and management. A means for transmitting the first broadcast data and the second broadcast data to the UE periodically via the first satellite may be, e.g., the satellite transceiver 1002 and one or more processors 1004 with dedicated hardware or implementing executable code or software instructions in memory 1010, such as the broadcast data transmit module 1016. A means for receiving a registration request from the UE to a serving core network in a serving PLMN associated with a serving virtual cell or a virtual tracking area in which the UE is located via the first satellite may be, e.g., the satellite transceiver 1002 and one or more processors 1004 with dedicated hardware or implementing executable code or software instructions in memory 1010, such as the registration receive module 1018. A means for providing the registration request to a first entity in the serving core network may be, e.g., the external interface 1006 and one or more processors 1004 with dedicated hardware or implementing executable code or software instructions in memory 1010, such as the registration transmit module 1020.

In some implementations, the information for the first satellite may be an identifier for the satellite RAN node, locations of ground stations for the satellite RAN node, wherein the ground stations are in wireless coverage of the first satellite, and a list of virtual tracking areas and corresponding PLMNs that are in the wireless coverage of the first satellite, wherein the PLMNs are accessible from the satellite RAN node. Where the first satellite is not in geostationary orbit, the satellite Radio Access Network (RAN) node may include a means for virtual tracking movement and change of virtual cell or virtual tracking area coverage or both of the first satellite and updating the information for the first satellite to correctly align with a new wireless coverage area of the first satellite, which may be, e.g., the satellite transceiver 1002 and one or more processors 1004 with dedicated hardware or implementing executable code or software instructions in memory 1010, such as the tracking module 1026 and broadcast data transmit module 1016.

The satellite Radio Access Network (RAN) node may include a means for receiving via the first satellite in wireless communication with the UE periodic measurements of visible satellites from the UE and means for determining a second satellite for the wireless communication with the UE based on one or more of improved signal reception at the UE, coverage for a current location of the UE at current and later times based on satellite orbital data for the second satellite if the second satellite is in non-geostationary orbit, an ability to access the second satellite from a ground station associated with the satellite RAN node, or a combination thereof; and means for providing to the UE, via the first satellite, handover instructions for UE handover from the first satellite to the second satellite, which may be, e.g., the satellite transceiver 1002 and one or more processors 1004 with dedicated hardware or implementing executable code or software instructions in memory 1010, such as the handover module 1022.

The satellite Radio Access Network (RAN) node may include a means for receiving a paging request and a virtual tracking area identifier or a virtual cell identifier for the UE in which the UE is last known to be located when the UE is in an idle state from a second entity in the serving core network and a means for broadcasting the paging request to the UE via all satellites with wireless coverage of the virtual tracking area or virtual cell identifier, which may be, e.g., the satellite transceiver 1002 and one or more processors 1004 with dedicated hardware or implementing executable code or software instructions in memory 1010, such as the paging module 1024 and broadcast data transmit module 1016.

The satellite Radio Access Network (RAN) node may include a means for receiving from the UE signal measurements for one or more satellites, a means for estimating a position of the UE using the signal measurements; a means for determining a virtual tracking area of the UE based on the position of the UE; and a means for providing an identifier for the virtual tracking area to the UE, which may be, e.g., the satellite transceiver 1002 and one or more processors 1004 with dedicated hardware or implementing executable code or software instructions in memory 1010, such as the tracking module 1026 and broadcast data transmit module 1016.

The satellite Radio Access Network (RAN) node may include a means for facilitating an emergency (EM) call from the UE through the first satellite to a public safety answering point (PSAP) associated with the serving virtual cell or the virtual tracking area in which the UE is located, which may be, e.g., the satellite transceiver 1002 and one or more processors 1004 with dedicated hardware or implementing executable code or software instructions in memory 1010, such as the EM module 1028.

The satellite Radio Access Network (RAN) node may include a means for supporting Wireless Emergency Alerting (WEA) associated with the serving virtual cell comprising broadcasting via the first satellite a WEA message associated with the serving virtual cell, which may be, e.g., the satellite transceiver 1002 and one or more processors 1004 with dedicated hardware or implementing executable code or software instructions in memory 1010, such as the WEA module 1030. For example, the satellite Radio Access Network (RAN) node may include a means for sending a broadcast from the first satellite for each of one or more virtual cells within a wireless coverage area of the first satellite, wherein the broadcast associated with the serving virtual cell contains one or more WEA messages assigned to the serving virtual cell, which may be, e.g., the satellite transceiver 1002 and one or more processors 1004 with dedicated hardware or implementing executable code or software instructions in memory 1010, such as the WEA module 1030. For example, the satellite Radio Access Network (RAN) node may include a means for sending a broadcast from the first satellite that contains all WEA messages for virtual cells within a wireless coverage area of the first satellite, each WEA message including one or more virtual cell identifiers for which it is applicable, which may be, e.g., the satellite transceiver 1002 and one or more processors 1004 with dedicated hardware or implementing executable code or software instructions in memory 1010, such as the WEA module 1030. For example, the satellite Radio Access Network (RAN) node may include a means for sending a first broadcast from the first satellite that contains all WEA messages for virtual cells within a wireless coverage area of the first satellite, each WEA message including an associated reference identifier; and sending a second broadcast from the first satellite that contains one or more reference identifiers associated with the serving virtual cell, which may be, e.g., the satellite transceiver 1002 and one or more processors 1004 with dedicated hardware or implementing executable code or software instructions in memory 1010, such as the WEA module 1030.

Figure 11:
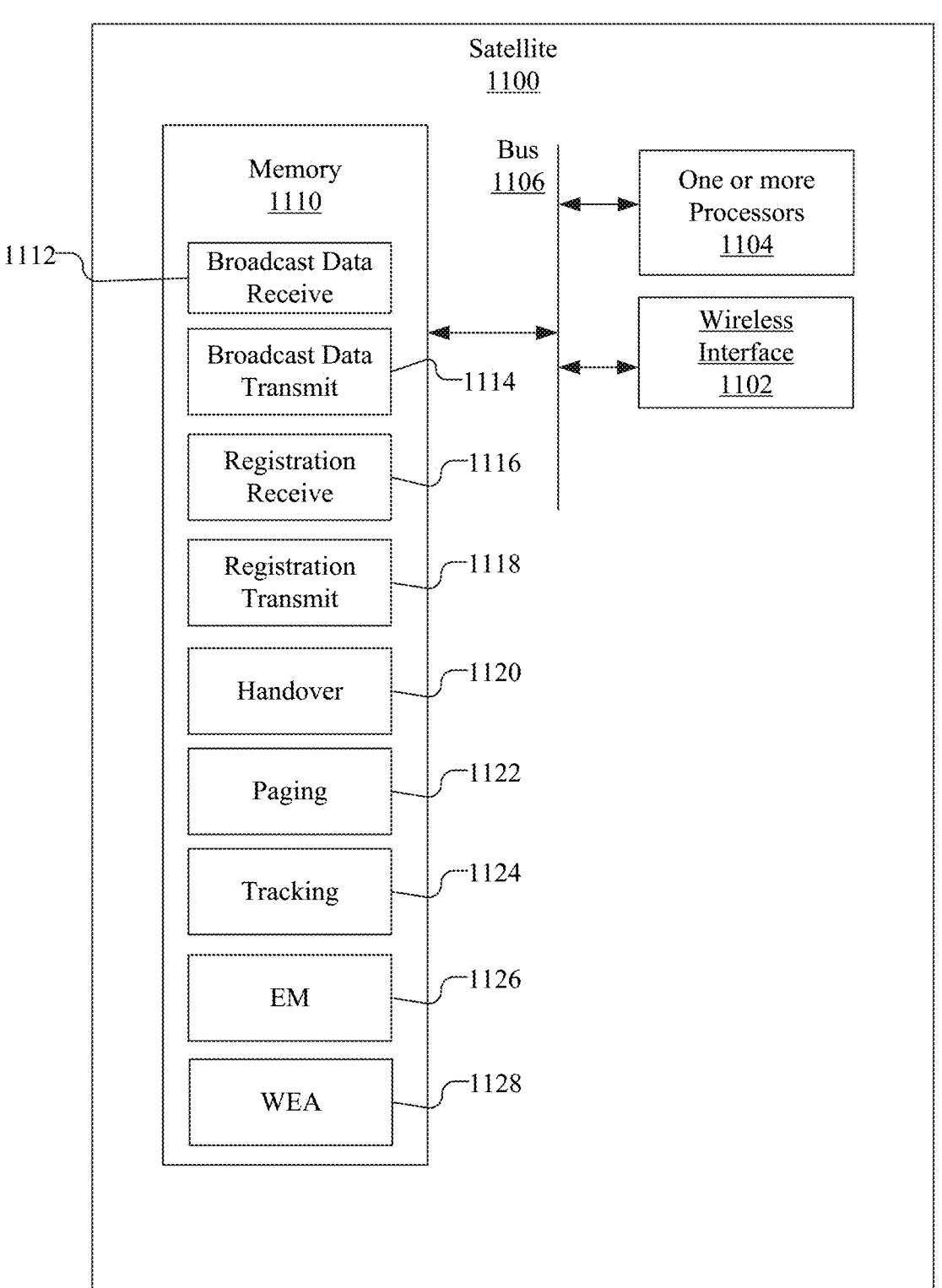
FIG. 11 is a block diagram of an embodiment of a satellite capable of supporting satellite access in 5G NR.

FIG. 11 is a diagram illustrating an example of a hardware implementation of a satellite, e.g., satellite 115 shown in FIGS. 1, 2, and 5, that is configured to be in wireless communication with a satellite Radio Access Network (RAN) node (SRN), e.g., sNB 112, to support satellite wireless access by a user equipment (UE), e.g., UE 105. The satellite 1100 may perform the process flow 800 of FIG. 8. The satellite 1100 includes, e.g., hardware components such as a wireless transceiver 1102 capable of communicating with UEs 105, as well as SRNs 112. The satellite 1100 includes one or more processors 1104 and memory 1110, which may be coupled together with a bus 1106. The memory 1110 may contain executable code or software instructions that when executed by the one or more processors 1104 cause the one or more processors 1104 to operate as a special purpose computer programmed to perform the techniques disclosed herein (e.g. such as the process flow 800 shown in FIG. 8).

As illustrated in FIG. 11, the memory 1110 may include one or more components or modules that may be implemented by the one or more processors 1104 to perform the methodologies as described herein. While the components or modules are illustrated as software in memory 1110 that is executable by the one or more processors 1104, it should be understood that the components or modules may be firmware or dedicated hardware either in the one or more processors 1104 or off the processors.

As illustrated, the memory 1110 may include a broadcast data receive module 1112 that when implemented by the one or more processors 1104 configures the one or more processors 1104 to receive via the wireless transceiver 1102 first broadcast data from an SRN, the first broadcast data containing information for virtual cells and virtual tracking areas associated with one or more public land mobile networks (PLMNs), wherein virtual cells and virtual tracking areas are defined as fixed geographic areas, e.g., as illustrated in stage 2 of FIG. 5. Additionally, the one or more processors 1104 may be configured to receive second broadcast data from the SRN, the second broadcast data containing information for the satellite, e.g., as illustrated in stage 2 of FIG. 5.

The memory 1110 may include a broadcast data transmit module 1114 that when implemented by the one or more processors 1104 configures the one or more processors 1104 to transmit periodically via the wireless transceiver 1102 the first broadcast data and the second broadcast data to the UE, e.g., as illustrated in stage 2 of FIG. 5. The one or more processors 1104 may be configured to update information for a satellite to correctly align with a new wireless coverage area of the satellite via the wireless transceiver 1102.

The memory 1110 may include a registration receive module 1116 that when implemented by the one or more processors 1104 configures the one or more processors 1104 to receive via the wireless transceiver 1102 a registration request from the UE to a serving core network in a serving PLMN associated with a serving virtual cell or a virtual tracking area in which the UE is located, e.g., as illustrated in stage 6 of FIG. 5.

The memory 1110 may include a registration transmit module 1118 that when implemented by the one or more processors 1104 configures the one or more processors 1104 to transmit via the wireless transceiver 1102 the registration request to the SRN to be sent to the serving core network, e.g., as illustrated in stage 6 of FIG. 5.

The memory 1110 may include a handover module 1120 that when implemented by the one or more processors 1104 configures the one or more processors 1104, e.g., via wireless transceiver 1102, to provide periodic measurements of visible satellites from the UE to the SRN, and to provide instructions from the SRN to the UE for handover from a second satellite, and to perform the handover from to the second satellite.

The memory 1110 may include a paging module 1122 that when implemented by the one or more processors 1104 configures the one or more processors 1104, e.g., via wireless transceiver 1102, to receive a paging request for the UE when the UE is in an idle state from the SRN and has a last known location that is in a virtual tracking area that is in a wireless coverage of the satellite and to broadcasting the paging request to the UE.

The memory 1110 may include a tracking module 1124 that when implemented by the one or more processors 1104 configures the one or more processors 1104, e.g., via wireless transceiver 1102, to provide signal measurements of one or more satellites to the SRN from the UE, and provide a virtual tracking area to the UE determined by the SRN based on a position of the UE determined using the signaling measurements.

The memory 1110 may include a EM module 1126 that when implemented by the one or more processors 1104 configures the one or more processors 1104, e.g., via wireless transceiver 1102, to facilitate an emergency (EM) call from the UE through the SRN to a public safety answering point (PSAP) associated with the serving virtual cell or the virtual tracking area in which the UE is located.

The memory 1110 may include a WEA module 1128 that when implemented by the one or more processors 1104 configures the one or more processors 1104, e.g., via wireless transceiver 1102, to support Wireless Emergency Alerting (WEA) associated with the serving virtual cell including broadcasting a WEA message associated with the serving virtual cell. For example, the one or more processors 1104 may be configured to send a broadcast for each virtual cell in each virtual tracking area within a wireless coverage area of the satellite, wherein the broadcast associated with the serving virtual cell contains one or more WEA messages assigned to the serving virtual cell. The one or more processors 1104 may be configured to send a broadcast that contains all WEA messages for virtual tracking areas within a wireless coverage area of the satellite, each WEA message including a virtual cell identifier for which it is applicable. The one or more processors 1104 may be configured to send a first broadcast that contains all WEA messages for virtual tracking areas within a wireless coverage area of the satellite, each WEA message including an associated reference identifier; and to send a second broadcast that contains a reference identifier associated with the serving virtual cell.

The methodologies described herein may be implemented by various means depending upon the application. For example, these methodologies may be implemented in hardware, firmware, software, or any combination thereof. For a hardware implementation, the one or more processors 1104 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of satellite 1100 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1110) and executed by one or more processors 1104, causing the one or more processors 1104 to operate as a special purpose computer programmed to perform the techniques disclosed herein. Memory may be implemented within the one or processors 1104 or external to the one or more processors 1104. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by satellite 1100 may be stored as one or more instructions or code on a non-transitory computer-readable storage medium such as memory 1110. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for satellite 1100 may be provided as signals on transmission media included in a communication apparatus. For example, a communication apparatus comprising part or all of satellite 1100 may include a transceiver having signals indicative of instructions and data. The instructions and data are stored on non-transitory computer readable media, e.g., memory 1110, and are configured to cause the one or more processors 1104 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a satellite that is in wireless communication with a satellite Radio Access Network (RAN) node (SRN) may include a means for receiving first broadcast data from the SRN, the first broadcast data containing information for virtual cells or virtual tracking areas or both associated with one or more public land mobile networks (PLMNs), wherein virtual cells or virtual tracking areas or both are defined as fixed geographic areas, which may be, e.g., the wireless transceiver 1102 and one or more processors 1104 with dedicated hardware or implementing executable code or software instructions in memory 1110, such as the broadcast data receive module 1112. A means for receive second broadcast data from the SRN, the second broadcast data containing information for the satellite may be, e.g., the wireless transceiver 1102 and one or more processors 1104 with dedicated hardware or implementing executable code or software instructions in memory 1110, such as the broadcast data receive module 1112. A means for transmitting the first broadcast data and the second broadcast data to the UE periodically may be, e.g., the wireless transceiver 1102 and one or more processors 1104 with dedicated hardware or implementing executable code or software instructions in memory 1110, such as the broadcast data transmit module 1114. A means for receiving a registration request from the UE to a serving core network in a serving PLMN associated with a serving virtual cell or a virtual tracking area in which the UE is located may be, e.g., the wireless transceiver 1102 and one or more processors 1104 with dedicated hardware or implementing executable code or software instructions in memory 1110, such as the registration receive module 1116. A means for providing the registration request to the SRN to be sent to the serving core network may be, e.g., the wireless transceiver 1102 and one or more processors 1104 with dedicated hardware or implementing executable code or software instructions in memory 1110, such as the registration transmit module 1118.

In one implementation, the information for the satellite may include identifiers for one or more SRNs, locations of ground stations for the one or more SRNs, wherein the ground stations are in wireless coverage of the satellite, and a list of virtual tracking areas and corresponding PLMNs that are in the wireless coverage of the satellite, wherein the PLMNs are accessible from the one or more SRNs. The satellite is not in geostationary orbit, and may include means for updating the information for the satellite to correctly align with a new wireless coverage area of the satellite, which may be, e.g., the wireless transceiver 1102 and one or more processors 1104 with dedicated hardware or implementing executable code or software instructions in memory 1110, such as the broadcast data transmit module 1114.

The satellite may include a means for providing periodic measurements of visible satellites from the UE to the SRN, a means for providing instructions from the SRN to the UE for handover from the satellite to a second satellite; and means for performing the handover from the satellite to the second satellite, which may be, e.g., the wireless transceiver 1102 and one or more processors 1104 with dedicated hardware or implementing executable code or software instructions in memory 1110, such as the handover module 1120.

The satellite may include a means for receiving a paging request for the UE when the UE is in an idle state from the SRN and has a last known location that is in a virtual tracking area or a virtual cell that is in a wireless coverage of the satellite; and means for broadcasting the paging request to the UE, which may be, e.g., the wireless transceiver 1102 and one or more processors 1104 with dedicated hardware or implementing executable code or software instructions in memory 1110, such as the paging module 1122.

The satellite may include a means for providing signal measurements of one or more satellites to the SRN from the UE, and a means for providing a virtual tracking area to the UE determined by the SRN based on a position of the UE determined using the signaling measurements, which may be, e.g., the wireless transceiver 1102 and one or more processors 1104 with dedicated hardware or implementing executable code or software instructions in memory 1110, such as the tracking module 1124.

The satellite may include a means for facilitating an emergency (EM) call from the UE through the SRN to a public safety answering point (PSAP) associated with the serving virtual cell or the virtual tracking area in which the UE is located, which may be, e.g., the wireless transceiver 1102 and one or more processors 1104 with dedicated hardware or implementing executable code or software instructions in memory 1110, such as the EM module 1126.

The satellite may include a means for supporting Wireless Emergency Alerting (WEA) associated with the serving virtual cell comprising broadcasting a WEA message associated with the serving virtual cell, which may be, e.g., the wireless transceiver 1102 and one or more processors 1104 with dedicated hardware or implementing executable code or software instructions in memory 1110, such as the WEA module 1128. For example, the satellite may include a means for sending a broadcast for each of one or more virtual cells within a wireless coverage area of the satellite, wherein the broadcast associated with the serving virtual cell contains one or more WEA messages assigned to the serving virtual cell, which may be, e.g., the wireless transceiver 1102 and one or more processors 1104 with dedicated hardware or implementing executable code or software instructions in memory 1110, such as the WEA module 1128. The satellite may include a means for sending a broadcast that contains all WEA messages for virtual cells within a wireless coverage area of the satellite, each WEA message including one or more virtual cell identifiers for which it is applicable, which may be, e.g., the wireless transceiver 1102 and one or more processors 1104 with dedicated hardware or implementing executable code or software instructions in memory 1110, such as the WEA module 1128. The satellite may include a means for sending a first broadcast that contains all WEA messages for virtual cells within a wireless coverage area of the satellite, each WEA message including an associated reference identifier; and sending a second broadcast that contains one or more reference identifiers associated with the serving virtual cell, which may be, e.g., the wireless transceiver 1102 and one or more processors 1104 with dedicated hardware or implementing executable code or software instructions in memory 1110, such as the WEA module 1128.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

In an embodiment, a first example independent claim may include a method for supporting location of a user equipment (UE) at a first wireless node, comprising receiving a first request for broadcast of an increased quantity of location-related information, the broadcast based on a wireless access type for the first wireless node; and broadcasting the increased quantity of location-related information using the wireless access type and based on the first request.

Example dependent claims may include one or more of the following features. The wireless access type is Fifth Generation (5G), New Radio (NR) or Long Term Evolution (LTE). The location-related information comprises a Positioning Reference Signal (PRS). The increased quantity of location-related information comprises an increased PRS bandwidth, an increased frequency of PRS positioning occasions, an increased duration for a PRS positioning occasion, an increased number of separate PRS signals, a transmission of PRS using an uplink carrier frequency, or some combination thereof. The method may further include sending a second request for a muting of transmission to a second wireless node for the wireless access type, wherein the muting of transmission is based on avoiding radio interference with the broadcast of the increased quantity of location-related information by the first wireless node. The location-related information may comprise location assistance data. The location assistance data may comprise assistance data for Observed Time Difference Of Arrival (OTDOA), assistance data for Assisted Global Navigation Satellite System (A-GNSS), assistance data for Real Time Kinematics (RTK), assistance data for Precise Point Positioning (PPP), assistance data for Differential GNSS (DGNSS), or any combination thereof. The increased quantity of location-related information may comprise an increased quantity of location assistance data, additional types of location assistance data, an increased frequency of broadcasting location assistance data, an increased repetition of the broadcasting of the location assistance data, or any combination thereof. The first request may be received from a third wireless node. The first request may be received from the UE. The first request may be received using a Radio Resource Control (RRC) protocol for the wireless access type. The first wireless node may be a serving wireless node for the UE based on the wireless access type. The method may further include sending a third request for the broadcast of an increased quantity of location-related information to a fourth wireless node for the wireless access type, wherein the third request is based on the first request. The method may further include sending a response to the UE, wherein the response comprises a confirmation of the broadcasting of the increased quantity of location-related information by the first wireless node. The method may further include receiving a fourth request from the UE for a termination of the broadcast of the increased quantity of location-related information, and terminating the broadcasting of the increased quantity of location-related information using the wireless access type based on the fourth request.

While some of the techniques, processes, and/or implementations presented herein may comply with all or part of one or more standards, such techniques, processes, and/or implementations may not, in some embodiments, comply with part or all of such one or more standards.

Implementation examples are described in the following numbered clauses:

Clause 1. An example method of geofencing for satellite communication performed by a UE, the method comprising receiving broadcast data from a first satellite, the broadcast data containing information for virtual cells or virtual tracking areas or both in wireless coverage of the first satellite and associated with one or more public land mobile networks (PLMNs), wherein the virtual cells or the virtual tracking areas or both are defined as fixed geographic areas, wherein the information for the virtual cells or the virtual tracking areas or both comprises at least one of: locations of grid points in an array of grid points, wherein the array of grid points comprises additional grid points assigned to virtual cells on each side of an international border so that a closest grid point to any location is in a same country as that location; virtual cell identifiers associated with the grid points; tracking area identifiers associated with one or more of the virtual tracking areas, the virtual cell identifiers or the grid points; or PLMN identifiers associated with one or more of the grid points, the virtual cell identifiers or the tracking area identifiers; obtaining a position of the UE; and performing a registration with a serving core network in a serving PLMN associated with a serving virtual cell or virtual tracking area in which the UE is located via the first satellite and a serving satellite Radio Access Network (RAN) node (SRN).

Clause 2. The method of the clause 1, further comprising: determining the serving virtual cell or virtual tracking area in which the UE is located based on the position of the UE and the information for the virtual cells or the virtual tracking areas or both.

Clause 3. The method of any of clause 1 or 2, wherein determining the serving virtual cell or virtual tracking area in which the UE is located comprises: determining a grid point that is closest to the position of the UE, wherein the serving virtual cell or virtual tracking area in which the UE is located is a virtual cell or virtual tracking area associated with a grid point that is closest to the position of the UE.

Clause 4. The method of any of clauses 1-3, wherein determining the serving virtual cell or the virtual tracking area in which the UE is located further comprises: determining a country in which the UE is located; and determining a grid point that is in the country in which the UE is located and that is closest to the position of the UE, wherein the serving virtual cell or the virtual tracking area in which the UE is located is a virtual cell or virtual tracking area associated with a grid point that is closest to the position of the UE and that is in the country in which the UE is located.

Clause 5. The method of any of clauses 1-4, further comprising: receiving information for the first satellite, the information for the first satellite comprising identifiers for one or more satellite Radio Access Network (RAN) nodes (SRNs), locations of ground stations for the one or more SRNs, wherein the ground stations are in wireless coverage of the first satellite, and a list of virtual tracking areas and corresponding PLMNs that are in the wireless coverage of the first satellite, wherein the PLMNs are accessible from the one or more SRNs; and obtaining a serving SRN by determining the serving SRN as an SRN from the one or more SRNs with a ground station that is closest to the position of the UE.

Clause 6. The method of any of clauses 1-5, further comprising: providing periodic measurements of visible satellites to the serving SRN; receiving instructions from the serving SRN for handover from the first satellite to a second satellite; and performing the handover from the first satellite to the second satellite.

Clause 7. The method of any of clauses 1-6, further comprising: entering an idle state; and camping on a second satellite for which the UE has signal reception and that indicates coverage of the virtual tracking area in which the UE is located.

Clause 8. The method of any of clauses 1-7, wherein obtaining the position of the UE and determining the virtual tracking area in which the UE is located comprises: selecting the first satellite, wherein the first satellite provides signal reception and access to a preferred PLMN; establishing a signaling connection with an SRN associated with the preferred PLMN and that is accessible from the first satellite, wherein the SRN determines the position of the UE using measurements received from the UE and the first satellite; and receiving the virtual tracking area in which the UE is located from the SRN.

Clause 9. The method of any of clauses 1-8, wherein the serving PLMN is associated with the serving virtual cell.

Clause 10. The method of any of clauses 1-9, further comprising: initiating an emergency (EM) call to a public safety answering point (PSAP) associated with the serving virtual cell comprising: obtaining an emergency session through the first satellite via a first entity in the serving core network in the serving PLMN; performing an emergency registration with a second entity in the serving PLMN; and sending an emergency call to the second entity in the serving PLMN, wherein the emergency call includes an identifier for the serving virtual cell, wherein the second entity routes the emergency call to the PSAP associated with the identifier for the serving virtual cell.

Clause 11. The method of any of clauses 1-10, wherein Lawful Interception (LI) associated with the serving virtual cell is supported by an entity in the serving core network in the serving PLMN by providing information for the UE including a location of the serving virtual cell to a law enforcement agency.

Clause 12. The method of any of clauses 1-11, further comprising: supporting Wireless Emergency Alerting (WEA) associated with the serving virtual cell comprising receiving from the first satellite and displaying to a user of the UE a WEA message associated with the serving virtual cell.

Clause 13. The method of any of clauses 1-12, further comprising: receiving a broadcast from the first satellite for each of one or more virtual cells within a wireless coverage area of the first satellite, wherein the broadcast associated with the serving virtual cell contains one or more WEA messages assigned to the serving virtual cell.

Clause 14. The method of any of clauses 1-13, further comprising: receiving a broadcast from the first satellite that contains all WEA messages for virtual cells within a wireless coverage area of the first satellite, wherein each WEA message includes one or more virtual cell identifiers for which it is applicable or each WEA message includes an associated reference identifier; and receiving a second broadcast from the first satellite that contains one or more reference identifiers associated with the serving virtual cell.

Clause 15. An user equipment (UE) configured to support satellite wireless access, comprising: a satellite transceiver configured to communicate with satellites; at least one memory; and at least one processor coupled to the satellite transceiver and the at least one memory, the at least one processor configured to: receive broadcast data from a first satellite, the broadcast data containing information for virtual cells or virtual tracking areas or both in wireless coverage of the first satellite and associated with one or more public land mobile networks (PLMNs), wherein the virtual cells or the virtual tracking areas or both are defined as fixed geographic areas, wherein the information for the virtual cells or the virtual tracking areas or both comprises at least one of: locations of grid points in an array of grid points, wherein the array of grid points comprises additional grid points assigned to virtual cells on each side of an international border so that a closest grid point to any location is in a same country as that location; virtual cell identifiers associated with the grid points; tracking area identifiers associated with one or more of the virtual tracking areas, the virtual cell identifiers or the grid points; or PLMN identifiers associated with one or more of the grid points, the virtual cell identifiers or the tracking area identifiers; obtain a position of the UE; and perform a registration with a serving core network in a serving PLMN associated with a serving virtual cell or virtual tracking area in which the UE is located via the first satellite and a serving SRN.

Clause 16. The UE of the clause 15, wherein the at least one processor is further configured to: determine the serving virtual cell or virtual tracking area in which the UE is located based on the position of the UE and the information for the virtual cells or the virtual tracking areas or both.

Clause 17. The UE of any of clause 15 or 16, wherein to determine the serving virtual cell or virtual tracking area in which the UE is located, the at least one processor is further configured to: determine a grid point that is closest to the position of the UE, wherein the serving virtual cell or virtual tracking area in which the UE is located is a virtual cell or virtual tracking area associated with a grid point that is closest to the position of the UE.

Clause 18. The UE of any of clauses 15-17, wherein to determine the serving virtual cell or virtual tracking area in which the UE is located, the at least one processor is further configured to: determine a country in which the UE is located; and determine a grid point that is in the country in which the UE is located and that is closest to the position of the UE, wherein the serving virtual cell or the virtual tracking area in which the UE is located is a virtual cell or virtual tracking area associated with a grid point that is closest to the position of the UE and that is in the country in which the UE is located.

Clause 19. The UE of any of clauses 15-18, wherein the at least one processor is further configured to: receive information for the first satellite, the information for the first satellite comprising identifiers for one or more satellite Radio Access Network (RAN) nodes (SRNs), locations of ground stations for the one or more SRNs, wherein the ground stations are in wireless coverage of the first satellite, and a list of virtual tracking areas and corresponding PLMNs that are in the wireless coverage of the first satellite, wherein the PLMNs are accessible from the one or more SRNs; and obtain a serving SRN by determining the serving SRN as an SRN from the one or more SRNs with a ground station that is closest to the position of the UE.

Clause 20. The UE of any of clauses 15-19, wherein the at least one processor is further configured to: provide periodic measurements of visible satellites to the serving SRN; receive instructions from the serving SRN for handover from the first satellite to a second satellite; and perform the handover from the first satellite to the second satellite.

Clause 21. The UE of any of clauses 15-20, wherein the at least one processor is further configured to: enter an idle state; and camp on a second satellite for which the UE has signal reception and that indicates coverage of the virtual tracking area in which the UE is located.

Clause 22. The UE of any of clauses 15-21, wherein to obtain the position of the UE and determining the virtual tracking area in which the UE is located, wherein the at least one processor is further configured to: select the first satellite, wherein the first satellite provides signal reception and access to a preferred PLMN; establish a signaling connection with an SRN associated with the preferred PLMN and that is accessible from the first satellite, wherein the SRN determines the position of the UE using measurements received from the UE and the first satellite; and receive the virtual tracking area in which the UE is located from the SRN.

Clause 23. The UE of any of clauses 15-22, wherein the serving PLMN is associated with the serving virtual cell.

Clause 24. The UE of any of clauses 15-23, wherein the at least one processor is further configured to: initiate an emergency (EM) call to a public safety answering point (PSAP) associated with the serving virtual cell comprising: obtain an emergency session through the first satellite via a first entity in the serving core network in the serving PLMN; perform an emergency registration with a second entity in the serving PLMN; and send an emergency call to the second entity in the serving PLMN, wherein the emergency call includes an identifier for the serving virtual cell, wherein the second entity routes the emergency call to the PSAP associated with the identifier for the serving virtual cell.

Clause 25. The UE of any of clauses 15-24, wherein Lawful Interception (LI) associated with the serving virtual cell is supported by an entity in the serving core network in the serving PLMN by providing information for the UE including a location of the serving virtual cell to a law enforcement agency.

Clause 26. The UE of any of clauses 15-25, wherein the at least one processor is further configured to: support Wireless Emergency Alerting (WEA) associated with the serving virtual cell comprising receiving from the first satellite and displaying to a user of the UE a WEA message associated with the serving virtual cell.

Clause 27. The UE of any of clauses 15-26, wherein the at least one processor is further configured to: receive a broadcast from the first satellite for each of one or more virtual cells within a wireless coverage area of the first satellite, wherein the broadcast associated with the serving virtual cell contains one or more WEA messages assigned to the serving virtual cell.

Clause 28. The UE of any of clauses 15-27, wherein the at least one processor is further configured to: receive a broadcast from the first satellite that contains all WEA messages for virtual cells within a wireless coverage area of the first satellite, wherein each WEA message includes one or more virtual cell identifiers for which it is applicable or each WEA message includes an associated reference identifier; and receive a second broadcast from the first satellite that contains one or more reference identifiers associated with the serving virtual cell.

Clause 29. An example user equipment (UE) configured to support satellite wireless access, comprising: means for receiving broadcast data from a first satellite, the broadcast data containing information for virtual cells or virtual tracking areas or both in wireless coverage of the first satellite and associated with one or more public land mobile networks (PLMNs), wherein the virtual cells or the virtual tracking areas or both are defined as fixed geographic areas, wherein the information for the virtual cells or the virtual tracking areas or both comprises at least one of: locations of grid points in an array of grid points, wherein the array of grid points comprises additional grid points assigned to virtual cells on each side of an international border so that a closest grid point to any location is in a same country as that location; virtual cell identifiers associated with the grid points; tracking area identifiers associated with one or more of the virtual tracking areas, the virtual cell identifiers or the grid points; or PLMN identifiers associated with one or more of the grid points, the virtual cell identifiers or the tracking area identifiers; means for obtaining a position of the UE; and means for performing a registration with a serving core network in a serving PLMN associated with a serving virtual cell or virtual tracking area in which the UE is located via the first satellite and a serving SRN.

Clause 30. An example non-transitory storage medium including program code stored thereon, the program code is operable to configure at least one processor in a user equipment (UE) to support satellite wireless access, comprising: program code to receive broadcast data from a first satellite, the broadcast data containing information for virtual cells or virtual tracking areas or both in wireless coverage of the first satellite and associated with one or more public land mobile networks (PLMNs), wherein the virtual cells or the virtual tracking areas or both are defined as fixed geographic areas, wherein the information for the virtual cells or the virtual tracking areas or both comprises at least one of: locations of grid points in an array of grid points, wherein the array of grid points comprises additional grid points assigned to virtual cells on each side of an international border so that a closest grid point to any location is in a same country as that location; virtual cell identifiers associated with the grid points; tracking area identifiers associated with one or more of the virtual tracking areas, the virtual cell identifiers or the grid points; or PLMN identifiers associated with one or more of the grid points, the virtual cell identifiers or the tracking area identifiers; program code to obtain a position of the UE; and program code to perform a registration with a serving core network in a serving PLMN associated with a serving virtual cell or virtual tracking area in which the UE is located via the first satellite and a serving SRN.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method for supporting satellite wireless access for a user equipment (UE) from a first satellite, the method comprising:

obtaining information that defines each of one or more virtual cells or virtual tracking areas or both as a respective fixed geographic area located within wireless coverage of the first satellite and associated with one or more public land mobile networks (PLMNs), at least one of the virtual cells or the virtual tracking areas being outside radio coverage of any terrestrial base station, by receiving broadcast data from a first satellite, wherein the broadcast data includes the information;

obtaining a position of the UE;

determining, based on the obtained position of the UE and the included information, a serving virtual cell or a virtual tracking area in which the UE is located; and performing, via the first satellite and a serving satellite Radio Access Network (RAN) node (SRN) communicatively coupled with the first satellite, a registration of the UE with at least one of the one or more PLMNs, based at least in part on the determined serving virtual cell or virtual tracking area.

2. The method of claim 1, wherein obtaining the position of the UE and determining the serving virtual cell or the virtual tracking area in which the UE is located comprises:

establishing a signaling connection with an SRN associated with a PLMN that is accessible from the first satellite; and determining, with the SRN, the position of the UE using measurements received from the UE and the first satellite; and receiving, from the SRN, the serving virtual cell or the virtual tracking area in which the UE is located.

3. The method of claim 1, wherein:

the included information comprises at least one of:

locations of grid points in an array of grid points, wherein the array of grid points comprises additional grid points assigned to virtual cells on each side of an international border so that a closest grid point to any location is in a same country as that location;

virtual cell identifiers associated with the grid points;

tracking area identifiers associated with one or more of the virtual tracking areas, the virtual cell identifiers or the grid points; or PLMN identifiers associated with one or more of the grid points, the virtual cell identifiers or the tracking area identifiers; and determining the serving virtual cell or virtual tracking area in which the UE is located comprises determining a grid point that is closest to the position of the UE, wherein the serving virtual cell or virtual tracking area in which the UE is located is associated with a grid point that is closest to the position of the UE.

4. The method of claim 3, wherein determining the serving virtual cell or the virtual tracking area in which the UE is located further comprises:

determining a country in which the UE is located; and determining a grid point that is in the country in which the UE is located and that is closest to the position of the UE, wherein the serving virtual cell or the virtual tracking area in which the UE is located is associated with a grid point that is closest to the position of the UE and that is in the country in which the UE is located.

5. The method of claim 1, further comprising:

receiving information for the first satellite, the information for the first satellite comprising identifiers for one or more SRNs, locations of ground stations for the one or more SRNs, wherein the ground stations are in wireless coverage of the first satellite, and a list of virtual tracking areas and corresponding PLMNs that are in the wireless coverage of the first satellite, wherein the PLMNs are accessible from the one or more SRNs; and obtaining a serving SRN by determining the serving SRN as an SRN from the one or more SRNs with a ground station that is closest to the position of the UE.

6. The method of claim 5, further comprising:

providing periodic measurements of visible satellites to the serving SRN;

receiving instructions from the serving SRN for handover from the first satellite to a second satellite; and performing the handover from the first satellite to the second satellite.

7. The method of claim 1, further comprising:

entering an idle state; and camping on a second satellite for which the UE has signal reception and that indicates coverage of the virtual tracking area in which the UE is located.

8. The method of claim 2, wherein the first satellite provides signal reception and access to a preferred PLMN and the SRN is associated with the preferred PLMN.

9. The method of claim 1, wherein the at least one of the one or more PLMNs is associated with the serving virtual cell.

10. The method of claim 9, further comprising:

initiating an emergency (EM) call to a public safety answering point (PSAP) associated with the serving virtual cell comprising:

obtaining an emergency session through the first satellite via a first entity in the serving core network in the serving PLMN;

performing an emergency registration with a second entity in the serving PLMN; and sending an emergency call to the second entity in the serving PLMN, wherein the emergency call includes an identifier for the serving virtual cell, wherein the second entity routes the emergency call to the PSAP associated with the identifier for the serving virtual cell.

11. The method of claim 9, wherein Lawful Interception (LI) associated with the serving virtual cell is supported by an entity in the serving core network in the serving PLMN by providing information for the UE including a location of the serving virtual cell to a law enforcement agency.

12. The method of claim 9, further comprising:

supporting Wireless Emergency Alerting (WEA) associated with the serving virtual cell comprising receiving from the first satellite and displaying to a user of the UE a WEA message associated with the serving virtual cell.

13. The method of claim 12, further comprising:

receiving a broadcast from the first satellite for each of one or more virtual cells within a wireless coverage area of the first satellite, wherein the broadcast associated with the serving virtual cell contains one or more WEA messages assigned to the serving virtual cell.

14. The method of claim 12, further comprising:

receiving a broadcast from the first satellite that contains all WEA messages for virtual cells within a wireless coverage area of the first satellite, wherein each WEA message includes one or more virtual cell identifiers for which it is applicable or each WEA message includes an associated reference identifier; and receiving a second broadcast from the first satellite that contains one or more reference identifiers associated with the serving virtual cell.

15. A user equipment (UE) configured to support satellite wireless access, comprising:

a satellite transceiver configured to communicate with satellites;

at least one memory; and at least one processor coupled to the satellite transceiver and the at least one memory, the at least one processor configured to:

obtain information that defines each of one or more virtual cells or virtual tracking areas or both as a respective fixed geographic area located within wireless coverage of the first satellite and associated with one or more public land mobile networks (PLMNs), at least one of the virtual cells or the virtual tracking areas being outside radio coverage of any terrestrial base station, by receiving broadcast data from a first satellite, wherein the broadcast data includes the information;

obtain a position of the UE;

determine, based on the obtained position of the UE and the included information, a serving virtual cell or a virtual tracking area in which the UE is located; and perform, via the first satellite and a serving satellite Radio Access Network (RAN) node (SRN) communicatively coupled with the first satellite, a registration of the UE with at least one of the one or more PLMNs, based at least in part on the determined serving virtual cell or virtual tracking area.

16. The UE of claim 15, wherein the at least one processor is further configured to obtain the position of the UE and determine the serving virtual cell or the virtual tracking area in which the UE by:

establishing a signaling connection with an SRN associated with a PLMN that is accessible from the first satellite; and determining, with the SRN, the position of the UE using measurements received from the UE and the first satellite; and receiving, from the SRN, the serving virtual cell or the virtual tracking area in which the UE is located.

17. The UE of claim 15, wherein:

the included information further comprises at least one of:

locations of grid points in an array of grid points, wherein the array of grid points comprises additional grid points assigned to virtual cells on each side of an international border so that a closest grid point to any location is in a same country as that location;

virtual cell identifiers associated with the grid points;

tracking area identifiers associated with one or more of the virtual tracking areas, the virtual cell identifiers or the grid points; or PLMN identifiers associated with one or more of the grid points, the virtual cell identifiers or the tracking area identifiers; and the at least one processor is further configured to determine the serving virtual cell or virtual tracking area in which the UE is located by determining a grid point that is closest to the position of the UE, wherein the serving virtual cell or virtual tracking area in which the UE is located is associated with a grid point that is closest to the position of the UE.

18. The UE of claim 15, wherein the at least one processor is further configured to determine the serving virtual cell or virtual tracking area in which the UE is located by:

determining a country in which the UE is located; and determining a grid point that is in the country in which the UE is located and that is closest to the position of the UE, wherein the serving virtual cell or the virtual tracking area in which the UE is located is associated with a grid point that is closest to the position of the UE and that is in the country in which the UE is located.

19. The UE of claim 15, wherein the at least one processor is further configured to:

receive information for the first satellite, the information for the first satellite comprising identifiers for one or more SRNs, locations of ground stations for the one or more SRNs, wherein the ground stations are in wireless coverage of the first satellite, and a list of virtual tracking areas and corresponding PLMNs that are in the wireless coverage of the first satellite, wherein the PLMNs are accessible from the one or more SRNs; and obtain a serving SRN by determining the serving SRN as an SRN from the one or more SRNs with a ground station that is closest to the position of the UE.

20. The UE of claim 19, wherein the at least one processor is further configured to:

provide periodic measurements of visible satellites to the serving SRN;

receive instructions from the serving SRN for handover from the first satellite to a second satellite; and perform the handover from the first satellite to the second satellite.

21. The UE of claim 15, wherein the at least one processor is further configured to:

enter an idle state; and camp on a second satellite for which the UE has signal reception and that indicates coverage of the virtual tracking area in which the UE is located.

22. The UE of claim 16, wherein the first satellite provides signal reception and access to a preferred PLMN and the SRN is associated with the preferred PLMN.

23. The UE of claim 15, wherein the at least one of the one or more PLMNs is associated with the serving virtual cell.

24. The UE of claim 23, wherein the at least one processor is further configured to:

initiate an emergency (EM) call to a public safety answering point (PSAP) associated with the serving virtual cell comprising:

obtain an emergency session through the first satellite via a first entity in the serving core network in the serving PLMN;

perform an emergency registration with a second entity in the serving PLMN; and send an emergency call to the second entity in the serving PLMN, wherein the emergency call includes an identifier for the serving virtual cell, wherein the second entity routes the emergency call to the PSAP associated with the identifier for the serving virtual cell.

25. The UE of claim 23, wherein Lawful Interception (LI) associated with the serving virtual cell is supported by an entity in the serving core network in the serving PLMN by providing information for the UE including a location of the serving virtual cell to a law enforcement agency.

26. The UE of claim 23, wherein the at least one processor is further configured to:

support Wireless Emergency Alerting (WEA) associated with the serving virtual cell comprising receiving from the first satellite and displaying to a user of the UE a WEA message associated with the serving virtual cell.

27. The UE of claim 26, wherein the at least one processor is further configured to:

receive a broadcast from the first satellite for each of one or more virtual cells within a wireless coverage area of the first satellite, wherein the broadcast associated with the serving virtual cell contains one or more WEA messages assigned to the serving virtual cell.

28. The UE of claim 26, wherein the at least one processor is further configured to:

receive a broadcast from the first satellite that contains all WEA messages for virtual cells within a wireless coverage area of the first satellite, wherein each WEA message includes one or more virtual cell identifiers for which it is applicable or each WEA message includes an associated reference identifier; and receive a second broadcast from the first satellite that contains one or more reference identifiers associated with the serving virtual cell.

29. A user equipment (UE) configured to support satellite wireless access, comprising:

means for obtaining information that defines each of one or more virtual cells or virtual tracking areas or both as a respective fixed geographic area located within wireless coverage of the first satellite and associated with one or more public land mobile networks (PLMNs), at least one of the virtual cells or the virtual tracking areas being outside radio coverage of any terrestrial base station, by receiving broadcast data from a first satellite, wherein the broadcast data includes the information;

means for obtaining a position of the UE;

means for determining, based on the obtained position of the UE and the included information, a serving virtual cell or a virtual tracking area in which the UE is located; and means for performing, via the first satellite and a serving satellite Radio Access Network (RAN) node (SRN) communicatively coupled with the first satellite, a registration of the UE with at least one of the one or more PLMNs, based at least in part on the determined serving virtual cell or virtual tracking area.

30. A non-transitory storage medium including program code stored thereon, the program code being operable to configure at least one processor in a user equipment (UE) to support satellite wireless access and comprising:

program code to obtain information that defines each of one or more virtual cells or virtual tracking areas or both as a respective fixed geographic area located within wireless coverage of the first satellite and associated with one or more public land mobile networks (PLMNs), at least one of the virtual cells or the virtual tracking areas being outside radio coverage of any terrestrial base station, by receiving broadcast data from a first satellite, wherein the broadcast data includes the information;

program code to obtain a position of the UE;

program code to determine, based on the obtained position of the UE and the included information, a serving virtual cell or a virtual tracking area in which the UE is; and program code to perform, via the first satellite and a serving satellite Radio Access Network (RAN) node (SRN) communicatively coupled with the first satellite, a registration of the UE with at least one of the one or more PLMNs, based at least in part on the determined serving virtual cell or virtual tracking area.

*  *  *  *  *